(12) United States Patent
Allen et al.

(10) Patent No.: US 10,812,011 B2
(45) Date of Patent: Oct. 20, 2020

(54) ROOFTOP SOLAR SHADE STRUCTURE

(71) Applicants: Clayton Jay Allen, Peoria, AZ (US); Thomas Headley, Scottsdale, AZ (US); Mark Little, Surprise, AZ (US)

(72) Inventors: Clayton Jay Allen, Peoria, AZ (US); Thomas Headley, Scottsdale, AZ (US); Mark Little, Surprise, AZ (US)

(73) Assignees: Strategic Solar Energy, LLC, Chandler, AZ (US); DBM Global, Inc., Phoenix, AZ (US)

( * ) Notice: Subject to any disclaimer, the term of this patent is extended or adjusted under 35 U.S.C. 154(b) by 0 days.

(21) Appl. No.: 16/367,145

(22) Filed: Mar. 27, 2019

(65) Prior Publication Data

US 2019/0305717 A1    Oct. 3, 2019

Related U.S. Application Data

(60) Provisional application No. 62/648,672, filed on Mar. 27, 2018.

(51) Int. Cl.
*H02S 20/10* (2014.01)
*H02S 20/24* (2014.01)
*H02S 20/30* (2014.01)

(52) U.S. Cl.
CPC .............. *H02S 20/24* (2014.12); *H02S 20/30* (2014.12)

(58) Field of Classification Search
CPC .......... H02S 20/20; H02S 20/24; H02S 20/23; H02S 20/22; H02S 20/30; E04D 13/00;
(Continued)

(56) References Cited

U.S. PATENT DOCUMENTS 3,367,078 A    2/1968  Thompson
3,413,775 A    12/1968 Katz
(Continued)

FOREIGN PATENT DOCUMENTS

WO    2018064635    4/2018

OTHER PUBLICATIONS

USPTO; Non-Final Office Action dated Jul. 31, 2019 in the U.S. Appl. No. 15/721,585.
(Continued)

*Primary Examiner* — Beth A Stephan
(74) *Attorney, Agent, or Firm* — Snell & Wilmer L.L.P.

(57) ABSTRACT

An example solar structure is disclosed for providing shade to a roof of a building having a building support structure. The solar structure may comprise: a plurality of vertical supports; a plurality of connecting beams; and a plurality of solar panels, wherein the plurality of vertical supports couple the load of the solar structure directly to the building support structure. Example methods are disclosed for keeping rooftop equipment cooler and operating more efficiently and longer, for specifying smaller AC units, for extending the life of a roof, for reducing the heat entering a building from sunshine, for reducing the heat re-radiated from solar panels onto a roof, and for specifying smaller structural roof support beams. An example solar structure comprises a movable portion configured to move from a first position to a second position to allow rooftop equipment to be lifted off the roof through the solar structure.

20 Claims, 18 Drawing Sheets

(58) Field of Classification Search
CPC .......... F24J 2/045; F24J 2/5233; F24J 2/5239; F24J 2/5424
See application file for complete search history.

(56) References Cited

U.S. PATENT DOCUMENTS

| | | | |
|---|---|---|---|
| 4,656,792 | A | 4/1987 | Clark |
| 5,107,637 | A | 4/1992 | Robbins |
| 5,109,643 | A | 5/1992 | Speers |
| 5,125,608 | A | 6/1992 | McMaster et al. |
| 5,131,955 | A | 7/1992 | Stern et al. |
| 5,212,916 | A | 5/1993 | Dippel et al. |
| 5,261,435 | A | 11/1993 | Stanley et al. |
| 5,279,085 | A | 1/1994 | DiPaolo et al. |
| 5,478,407 | A | 12/1995 | Dorison et al. |
| 5,533,306 | A | 7/1996 | Aspenson |
| D408,554 | S | 4/1999 | Dinwoodie |
| 6,378,810 | B1 | 4/2002 | Pham et al. |
| 6,421,966 | B1 | 7/2002 | Braunstein et al. |
| 6,590,363 | B2 | 7/2003 | Teramoto |
| 6,722,357 | B2 | 4/2004 | Shingleton et al. |
| 6,930,237 | B2 | 8/2005 | Mattiuzzo |
| 7,252,083 | B2 | 8/2007 | Hayden |
| 7,435,897 | B2 | 10/2008 | Russell |
| 7,531,741 | B1 | 5/2009 | Melton et al. |
| 7,647,924 | B2 | 1/2010 | Hayden |
| D611,404 | S | 3/2010 | Mackler |
| D611,405 | S | 3/2010 | Mackler |
| D643,937 | S | 8/2011 | Boesch |
| 8,013,569 | B2 | 9/2011 | Hartman |
| D657,736 | S | 4/2012 | Mackler |
| D657,737 | S | 4/2012 | Mackler |
| D657,738 | S | 4/2012 | Mackler |
| D664,916 | S | 8/2012 | Conger |
| 8,294,022 | B2 | 10/2012 | Lenox |
| 8,402,704 | B2 | 3/2013 | Hartley et al. |
| 8,464,496 | B2 | 6/2013 | Cusson et al. |
| 8,511,007 | B2 | 8/2013 | Powers, III |
| 8,650,812 | B2 | 2/2014 | Cusson |
| 8,776,454 | B2 | 7/2014 | Zuritis |
| 8,825,500 | B2 | 9/2014 | DeBartolo, III et al. |
| 9,335,069 | B2 | 5/2016 | DeBartolo, III et al. |
| 9,369,083 | B2* | 6/2016 | Luo .......... E04D 13/00 |
| 10,044,319 | B2 | 8/2018 | Zante |
| 10,277,160 | B2 | 4/2019 | DeBartolo, III et al. |
| 2003/0177706 | A1 | 9/2003 | Ullman |
| 2004/0025931 | A1 | 2/2004 | Aguglia |
| 2004/0065025 | A1 | 4/2004 | Durham |
| 2004/0261955 | A1 | 12/2004 | Shingleton et al. |
| 2005/0035244 | A1 | 2/2005 | Conger |
| 2005/0109384 | A1 | 5/2005 | Shingleton et al. |
| 2005/0241246 | A1 | 11/2005 | Sinha et al. |
| 2006/0090788 | A1 | 5/2006 | Oak |
| 2006/0090858 | A1 | 5/2006 | Heidenreich |
| 2008/0216418 | A1 | 9/2008 | Durham |
| 2008/0257402 | A1 | 10/2008 | Kamp et al. |
| 2008/0283112 | A1 | 11/2008 | Conger |
| 2008/0283113 | A1 | 11/2008 | Conger |
| 2009/0038672 | A1 | 2/2009 | Conger |
| 2009/0045328 | A1 | 2/2009 | Fricke et al. |
| 2009/0050194 | A1 | 2/2009 | Noble et al. |
| 2009/0194669 | A1 | 8/2009 | Noble et al. |
| 2009/0199846 | A1* | 8/2009 | Collins .......... H02S 20/23 126/601 |
| 2009/0308434 | A1 | 12/2009 | Franceschini |
| 2010/0000165 | A1 | 1/2010 | Koller |
| 2010/0000596 | A1 | 1/2010 | Mackler |
| 2010/0043781 | A1 | 2/2010 | Jones et al. |
| 2010/0089433 | A1 | 4/2010 | Conger |
| 2010/0108113 | A1 | 5/2010 | Taggart et al. |
| 2010/0132769 | A1 | 6/2010 | Potter et al. |
| 2010/0175741 | A1 | 7/2010 | Thorne |
| 2010/0193013 | A1 | 8/2010 | Kong |
| 2010/0252092 | A1 | 10/2010 | Lenox |
| 2010/0258110 | A1 | 10/2010 | Krabbe et al. |
| 2010/0263660 | A1 | 10/2010 | Thorne |
| 2010/0275975 | A1 | 11/2010 | Monschke |
| 2010/0314509 | A1 | 12/2010 | Conger |
| 2011/0023931 | A1 | 2/2011 | Chen |
| 2011/0030285 | A1 | 2/2011 | Kaufman |
| 2011/0072742 | A1 | 3/2011 | Beck |
| 2011/0073161 | A1 | 3/2011 | Scanlon |
| 2011/0094559 | A1 | 4/2011 | Potter |
| 2011/0094569 | A1 | 4/2011 | Hartley et al. |
| 2011/0113705 | A1 | 5/2011 | Raczkowski |
| 2011/0133689 | A1 | 6/2011 | Uchihashi et al. |
| 2011/0221203 | A1 | 9/2011 | Miller |
| 2011/0277809 | A1 | 11/2011 | Dalland et al. |
| 2011/0290305 | A1 | 12/2011 | Hoffmann et al. |
| 2012/0016815 | A1 | 1/2012 | DeBartolo, III et al. |
| 2012/0031456 | A1 | 2/2012 | Christman et al. |
| 2012/0073219 | A1 | 3/2012 | Zuritis |
| 2012/0073565 | A1* | 3/2012 | Grant .......... F24S 25/617 126/606 |
| 2012/0131866 | A1 | 5/2012 | Batut et al. |
| 2012/0167960 | A1 | 7/2012 | Scorsone |
| 2012/0181973 | A1 | 7/2012 | Lyden |
| 2012/0291374 | A1 | 11/2012 | Zante |
| 2013/0076294 | A1 | 3/2013 | Smith |
| 2013/0229141 | A1 | 9/2013 | Johnson |
| 2014/0077055 | A1 | 3/2014 | Hamilton et al. |
| 2014/0223844 | A1* | 8/2014 | Luo .......... E04D 13/00 52/173.3 |
| 2014/0366466 | A1 | 12/2014 | DeBartolo, III et al. |
| 2015/0075588 | A1 | 3/2015 | Franklin et al. |
| 2016/0190974 | A1* | 6/2016 | Dickey .......... H02S 20/10 136/244 |
| 2016/0365826 | A1 | 12/2016 | DeBartolo, III et al. |
| 2017/0298615 | A1 | 10/2017 | Janabi |
| 2018/0041159 | A1 | 2/2018 | DeBartolo, III et al. |
| 2018/0048260 | A1 | 2/2018 | Ludwig et al. |

OTHER PUBLICATIONS

USTPO; Non-Final Office Action dated Jul. 30, 2019 in the U.S. Appl. No. 16/368,481.
USPTO; Requirement for Restriction dated May 30, 2013 in U.S. Appl. No. 13/185,190.
USPTO; Non-Final Office Action dated Aug. 23, 2013 in U.S. Appl. No. 13/185,190.
USPTO; Final Office Action dated Feb. 20, 2014 in U.S. Appl. No. 13/185,190.
USPTO; Notice of Allowance dated May 5, 2014 in U.S. Appl. No. 13/185,190.
USPTO; Requirement for Restriction dated Feb. 3, 2015 in U.S. Appl. No. 14/472,876.
USPTO; Non-Final Office Action dated Apr. 17, 2015 in U.S. Appl. No. 14/472,876.
USPTO; Final Office Action dated Dec. 9, 2015 in U.S. Appl. No. 14/472,876.
USPTO; Notice of Allowance dated Apr. 6, 2016 in U.S. Appl. No. 14/472,876.
USPTO; Requirement for Restriction dated Dec. 19, 2016 in U.S. Appl. No. 15/094,760.
USPTO; Non-Final Office Action dated Apr. 5, 2017 in U.S. Appl. No. 15/094,760.
USPTO; Final Office Action dated Oct. 12, 2017 in U.S. Appl. No. 15/094,760.
USPTO; Non-Final Office Action dated Apr. 26, 2018 in U.S. Appl. No. 15/094,760.
USPTO; Notice of Allowance dated Dec. 11, 2018 in U.S. Appl. No. 15/094,760.
USPTO; Requirement for Restriction dated Feb. 25, 2019 in U.S. Appl. No. 15/721,585.
PCT; International Search Report dated Dec. 22, 2017 in Application No. PCT/US2017/054615.
PCT; Written Opinion of the International Searching Authority dated Dec. 22, 2017 in Application No. PCT/US2017/054615.
PCT; International Preliminary Report on Patentability dated Apr. 2, 2019 in Application No. PCT/US2017/054615 (Matter 616).

(56) References Cited

OTHER PUBLICATIONS

PCT; International Search Report dated Jun. 24, 2019 in Application No. PCT/US2019/24432.
PCT; Written Opinion of the International Searching Authority dated Jun. 24, 2019 in the Application No. PCT/US2019/24432.
SunPower Corporation, Case Study for Foothill-De Anza College District, printed from https://us.sunpower.com/commercial-solar/case-studies/deanza-college/ alleging Apr. 2005 completion dated for the parking system constructed at De Anza College, pp. 1-2.
Strategic Solar Energy LLC, Complaint against Affordable Solar Installation, Inc., Dec. 29, 2016, 30 Pages.
Underground Carpenter publication, http://undergroundcarpenter.blogspot.com/2009/04/springs-preserve-in-las-vegas-nevada.html, Apr. 5, 2009, (accessed Oct. 4, 2017).
Green Energy vs Actual "Green" Energy, http://www.basinandrangewatch,org/SolarDesert.html, Nov. 1, 2008, (accessed Oct. 4, 2017).
Gibson, "Capturing the Desert Sun," Progressive Engineer Feature, 5 Pages, (2008).
Springs Preserve, Photograph Taken Jul. 29, 2008, https://www.flickr.com/photos/stuartwildlife/2760960352/in/phtotstream, (2008).
Working Railway Station, Photograph Taken Dec. 3, 2009, https://www.flickr.com/photos/nickhi/4155715767, (2009).
Parking Structure 1-apache Blvd.] Business and Finance, printed from https://cfo,asu.edu/solar-apache on Dec. 9, 2016 alleging Jan. 2009 comissioned dated, pp. 1-2.
Parking Structure 5-Stadium Dr. ] Business and Finance, printed from https://cfo.asu.edu/solar-stadium on Dec. 9, 2016 alleging Dec. 2008 comissioned dated, pp. 1-2.
USPTO; Notice of Allowance dated Feb. 27, 2020 in the U.S. Appl. No. 15/721,585.
USPTO; Notice of Allowance dated Feb. 27, 2020 in the U.S. Appl. No. 16/368,481.

\* cited by examiner

ROOFTOP SOLAR SHADE STRUCTURE

CROSS-REFERENCE TO RELATED APPLICATIONS

This application is a non-provisional of, and claims priority to, Provisional Application Ser. No. 62/648,672, filed Mar. 27, 2018 and entitled "ROOFTOP SOLAR SHADE STRUCTURE," and which is hereby incorporated by reference in its entirety.

FIELD OF INVENTION

The present disclosure generally relates to apparatus, systems, and methods for providing a solar energy shade structure over rooftops.

BACKGROUND OF THE INVENTION

Rooftop solar energy generation systems have been installed on the roofs of some buildings for many years. These systems have certain similarities. For example, most such systems are held to the roof by ballast and therefore add a significant weight load to the roof. Alternatively, some solar energy generation systems are held to the roof by bolts that penetrate the roof surface creating many locations for possible water leaks. In either case, the roof is compromised by adding traditional rooftop solar due to the weight of the solar panels and, additionally by the significant additional weight of the ballast it has to carry or by the many dispersed small penetrations required to secure the panels to the roof.

These solar energy generation systems are mounted low to the roof, and therefore take up space on the roof. It is also necessary to leave adequate space between rows of panels for a person to walk to facilitate servicing or removing the panels and to prevent self-shading problems. It is further necessary to leave open spaces on the roof for access aisles to rooftop equipment. In addition, it is necessary to leave open spaces around all rooftop equipment so the solar panels are not in the rooftop equipment's shadow pattern at any point during the day, throughout the year. Another disadvantage is that the roof surface must be resurfaced every several years, and when that occurs, the solar panels have to be removed to permit the resurfacing activity.

With these installations, not only is the roof compromised but the percentage of the roof that can be covered is relatively low. Often less than 30% of a roof can be covered with solar panels. See FIG. 1. Thus, it is desirable to have new and improved rooftop solar systems to address these and other problems.

SUMMARY OF THE INVENTION

In an example embodiment, a solar structure is disclosed for providing shade to a roof of a building, wherein the building has a building support structure. In this example embodiment, the solar structure comprises: a plurality of vertical supports; a plurality of connecting beams, wherein the plurality of vertical supports are configured to support the plurality of connecting beams at a first height above a surface of the roof of the building; and a plurality of solar panels supported by the plurality of connecting beams over the roof and configured to provide shade to the roof of the building, wherein the plurality of vertical supports couple the load of the solar structure directly to the building support structure.

In an example embodiment, a method is disclosed for constructing a steel frame structure of a building comprising: extending a steel frame above a roof surface for purpose of supporting an array of solar panels over a roof, wherein a load from the array of solar panels is transferred from the array of solar panels over the roof to the steel frame structure of the building; and wherein at least portion of a support structure for the array of solar panels is integrated into the steel frame structure of the building.

In an example embodiment, a method is disclosed for constructing a steel frame structure of a building comprising a steel frame above a roof surface for purpose of supporting an array of solar panels over a rooftop equipment located on a roof, wherein a load from the array of solar panels is transferred directly from the array of solar panels over the roof to the steel frame structure of the building.

In an example embodiment, a method is disclosed for keeping rooftop equipment cooler and operating more efficiently and longer, the method comprising constructing a steel frame structure of a building, the steel frame structure comprising a steel frame above a roof surface for purpose of supporting an array of solar panels over rooftop equipment.

In an example embodiment, a method is disclosed for specifying smaller AC units, the method comprising constructing a steel frame structure of a building, the steel frame structure comprising a steel frame above a roof surface for purpose of supporting an array of solar panels over the AC units and shading the AC units with the array of solar panels or a portion thereof.

In an example embodiment, a method is disclosed for extending the life of a roof, the method comprising constructing a steel frame structure of a building comprising a steel frame above a roof surface for purpose of supporting an array of solar panels over a rooftop and shading it with solar panels.

In an example embodiment, a method is disclosed for reducing the heat entering a building from sunshine, the method comprising constructing a steel frame structure of the building, the steel frame structure comprising a steel frame above a roof surface for purpose of supporting an array of solar panels over a roof and shading the roof with the array of solar panels or a portion thereof.

In an example embodiment, a method is disclosed for reducing the heat re-radiated from solar panels onto a roof, the method comprising constructing a steel frame structure of a building, the steel frame structure comprising a steel frame holding the solar panels between 4 and 20 feet above a roof surface for purpose of supporting an array of solar panels over a rooftop.

In an example embodiment, a solar structure is disclosed for providing shade to a roof of a building, the solar structure comprising: a plurality of vertical supports; a plurality of connecting beams, wherein the plurality of vertical supports are configured to support the plurality of connecting beams at a first height above a surface of the roof of the building; a plurality of solar panels supported by the plurality of connecting beams over the roof and configured to provide shade to the roof of the building, wherein the plurality of solar panels comprises an array of solar panels, wherein the solar structure supports the array of solar panels located over all or a portion of the roof of the building and at least one rooftop equipment; and a movable portion configured to move from a first position to a second position to allow the at least one rooftop equipment to be lifted off of the roof through the solar structure, wherein the movable portion further comprises at least two solar panels of the plurality of solar panels.

In an example embodiment, a solar structure is disclosed for providing shade to a roof of a building, the solar structure comprising: a plurality of solar panels, wherein the plurality of solar panels form a solar array; a plurality of vertical supports for supporting the solar array, wherein the solar array is located over the roof of the building and over at least one rooftop equipment; and a movable portion configured to move to create an opening that allows the at least one rooftop equipment to be lifted off of the roof through the solar structure.

In an example embodiment, a rooftop solar system is disclosed comprising: a solar array which shades a roof and rooftop equipment, the solar array having: a fixed portion, and at least one movable portion, comprising at least two solar panels of a plurality of solar panels of the solar array, and configured to move from a first position to a second position to allow access to the rooftop equipment from above the solar array.

In an example embodiment, a method is disclosed for designing the interior support structure of a building, the method comprising combining the interior support structure with a solar energy support structure above the roof consisting of columns and beams to reduce the required strength of the support structure below the roof as compared to the required strength of the support structure below the roof without the solar energy support structure above the roof.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and where:

DETAILED DESCRIPTION

Figure 1:
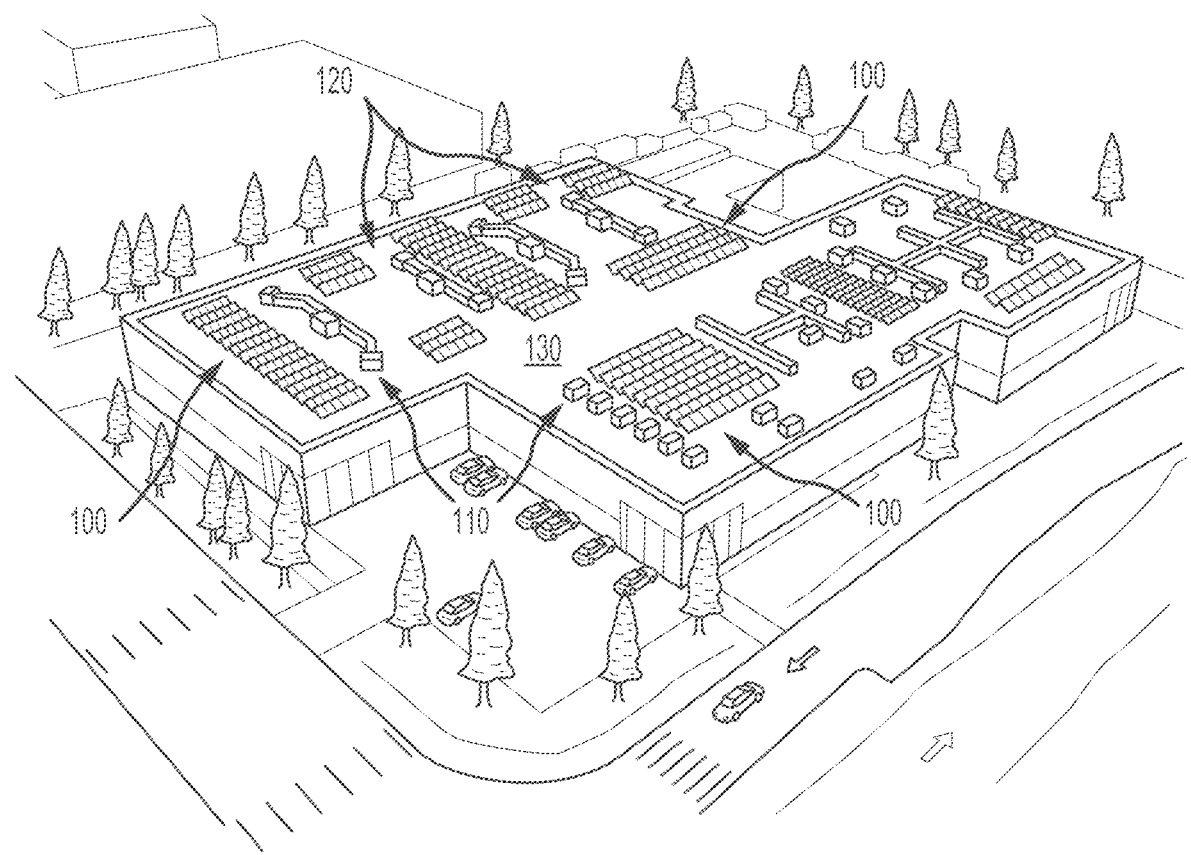
FIG. 1 illustrates a typical rooftop solar energy system.

The following description is of various example embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments, without departing from the scope of the appended claims. For example, the steps recited in any of the method or process descriptions may be executed in any order and are not necessarily limited to the order presented. Moreover, many of the manufacturing functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. As used herein, the terms "coupled," "coupling," or any other variation thereof, are intended to cover a physical connection, an electrical connection, a magnetic connection, an optical connection, a communicative connection, a functional connection, and/or any other connection.

For the sake of brevity, conventional techniques for mechanical system construction, management, operation, measurement, optimization, and/or control, as well as conventional techniques for mechanical power transfer, modulation, control, and/or use, may not be described in detail herein. Furthermore, the connecting lines shown in various figures contained herein are intended to represent example functional relationships and/or physical couplings between various elements. It should be noted that many alternative or additional functional relationships or physical connections may be present in a modular structure.

In an example embodiment, an elevated solar structure is disclosed, where the solar structure is elevated over and covering all or a significant portion of a roof of a building. The solar structure may be located over equipment on the roof of the building. The solar structure may comprise movable/removable portions that move to allow rooftop equipment to pass through the solar structure, for loading and unloading the rooftop equipment from the roof. As used herein, the roof is the upper surface of the building and does not include the structural members of the building supporting the roof.

The solar structure may be configured to provide shade to a roof of a building that has a building support structure, wherein the solar structure comprises a plurality of vertical supports and a plurality of connecting beams, and wherein the plurality of vertical supports are configured to support the plurality of connecting beams at a first height above a surface of the roof of the building. A plurality of solar panels may be supported by the plurality of connecting beams over the roof and may be configured to provide shade to the roof of the building. In an example embodiment, the plurality of vertical supports transfer the load of the solar structure, comprising the weight load of the solar structure, the seismic load of the solar structure, and the wind load of the solar structure, directly to the building support structure.

In an example embodiment, the solar structure may comprise vertical supports directly supported by the support structure of the building, without adding weight to the roof.

With reference now to FIG. 1, a typical rooftop solar system is illustrated. The rooftop solar system comprises roof mounted solar panels 100, rooftop equipment 110, and service/walk aisles 120. The rooftop solar system further comprises a roof surface 130. The roof mounted solar panels 100 may be held to the roof by ballast and therefore add a significant weight load to the roof. Alternatively, the roof mounted solar panels 100 may be held to the roof by bolts or other anchors that penetrate the roof surface 130 and that create many locations for possible water leaks. In an example embodiment, these roof-mounted solar panels 100 are mounted low to the roof, and therefore take up space on the roof. These typical roof-mounted solar panels 100 also need to have service/walk aisles 120 between rows of panels, for a person to walk, to facilitate servicing or removing the panels, and/or to prevent self-shading problems. In the typical configuration of FIG. 1, it is further necessary to leave open spaces on the roof (1) for rooftop equipment, (2) for service/walk aisles 120 around the rooftop equipment, and (3) so the solar panels are not in the equipment's shadow pattern at any point during the day, throughout the year. Therefore, with these installations, the percentage of the roof that can be covered is relatively low. Often less than 30% of a roof can be covered with solar panels.

Another disadvantage is that with the roof mounted solar panels 100, the roof surface must be resurfaced every several years, and when that occurs, the solar panels have to be removed to permit the resurfacing activity. This involves a large amount of labor, lost energy generation, and the possibility of breakage of the solar panels.

The rooftop equipment 110 may comprise, for example, fans, air conditioners, exhaust scrubbers, electrical equipment, HVAC units, and/or the like.

Figure 2:
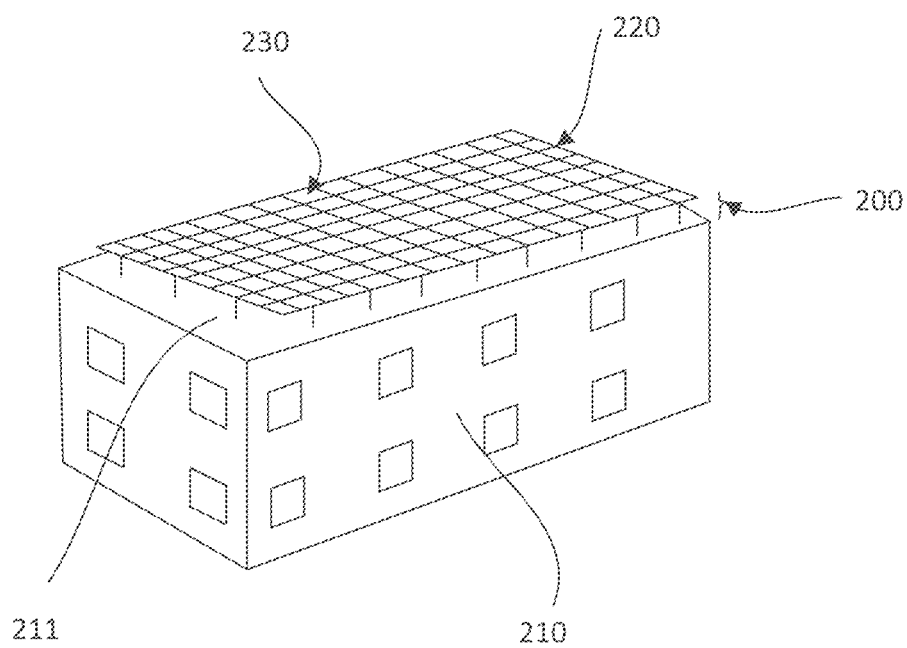
FIG. 2 illustrates a rooftop solar system, in accordance with an example embodiment.

With reference now to FIG. 2, an example rooftop solar system is disclosed. The rooftop solar system may also be referred to herein as a solar/shade structure 200. In an example embodiment, the solar/shade structure 200 provides shade to a roof 211 of a building 210. The shade may be provided by panels 230, preferably solar panels and/or shade panels laid out in an array supported by a solar array support structure 220.

In this example, it is noted that the solar/shade structure 200 covers a large percentage of the roof 211 of the building 210. For example, the solar/shade structure 200 may be configured to cover 100% of the roof 211 of the building 210. In various embodiments, the solar/shade structure 200 may be configured to extend beyond the vertical projection of the roof of the building. In other embodiments, the solar structure may be configured to cover 75%-100% of the roof of the building. Moreover, the solar structure may be configured to cover a large contiguous area over the roof of the building, regardless of the percentage of the building covered.

In an example embodiment, the solar array support structure comprises cantilevered portions projecting exterior to outermost vertical supports of the solar array support structure. For example, the cantilevered portions may be within a vertical projection of a roof area. In another example, the cantilevered portions may extend beyond the vertical projection of the roof area.

In particular, the solar/shade structure 200 may be configured to cover a contiguous area covering rooftop equipment without interruption of the array of solar panels supported by the solar structure. The solar/shade structure 200 may be configured to cover a contiguous area over the roof without aisles (service aisles or walk aisles) being located between the solar panels in the array of solar panels. Similarly, the solar/shade structure 200 may be configured to cover a contiguous area, over rooftop equipment and open spaces (service aisles, walk aisles, open space around the rooftop equipment, or other rooftop open space), with an array of solar panels that is uninterrupted by the rooftop equipment and/or open space. That said, a contiguous array of solar panels may nonetheless comprise openings for antennas, satellite dishes, exhaust stacks, movable/removable portions, and the like, and still be considered to cover a contiguous area. In an example embodiment, the solar structure may comprise an opening in a solar panel array that is sized and located as needed. The opening may accommodate tall equipment, such as cooling towers, antennas, exhaust stacks, or the like. In some embodiments, the manufacturer required vertical clearance above the equipment may necessitate an opening. For example, certain equipment or structures on the rooftop may be taller than the elevated solar panel array, or near enough in height to the height of the elevated solar panel array to lack the required clearance. In other example embodiments, a clear path to the sky may be advisable for antennas, exhaust stacks, cooling towers, and the like.

In another example embodiment, solar/shade structure 200 may be configured to provide one or more patches of solar structures covering portions of the rooftop. For example, solar/shade structure 200 may be at least 20 feet in length and at least 20 feet in width, in other example embodiments, the solar/shade structure 200 may be at least 30 feet, 40 feet, 60 feet, or 90 feet in length and may be at least 30 feet, 40 feet, 60 feet, or 90 feet in width. Moreover, the solar structure can be very large, for example, over a million square feet. In another example embodiment, the solar structure covers substantially all the rooftop equipment. In another example embodiment, the solar structure covers multiple pieces of rooftop equipment. In another example embodiment, all of the roof top equipment can be covered by one or more solar structures.

Moreover, it is anticipated that in some instances, the size of the solar structure may be limited by the amount of power that can be used on site. In this example embodiment, the size of the solar structure may be reduced accordingly, or shade panels may be used in the place of solar panels, to provide the shade while still covering a large portion of the building roof and/or equipment.

In these embodiments, the solar array support structure 220 and the solar panels it supports are located high above the roof. For example, the array of solar panels and supporting beams may be supported at a height above the roof so as to have a clearance great enough to clear the rooftop equipment and/or people walking under the solar structure on the roof. This will be described in greater detail with reference to FIGS. 3 and 4. Thus, the solar/shade structure 200 takes up no space on the roof (with the possible exception of the vertical supports). In an example embodiment, the solar/shade structure 200 is thus configured such that the roof can be resurfaced without removing the solar panels. In another example embodiment, the solar/shade structure 200 can eliminate the requirement to leave open space near the roof's parapets to avoid the parapet's shadow pattern. In another example embodiment, solar/shade structure 200 allows natural airflow around the rooftop equipment. Thus, in an example embodiment, solar/shade structure 200 is configured to cover a high percentage of a roof, or a large contiguous area of the roof, with solar panels for efficient energy generation that still allows easy access to all parts of the roof and to all rooftop equipment.

In an example embodiment, the solar/shade structure 200 weight is supported directly by the building support structure. In this example embodiment, the roof does not support the weight of the solar/shade structure 200, or stated another way is a non-loaded roof from the perspective of the solar/shade structure 200. The weight of the solar/shade structure 200 can be passed right through the building support structure to the ground. This is contrary to current practices that load the roof with the solar panel weight and often with additional ballast that holds the solar panels and structure to the roof.

In an example embodiment, the solar/shade structure 200 is designed at the time the building support structure is designed. The solar structure is configured to reduce the uplift wind load forces imparted on the upper interior structure of the building. Therefore, in an example embodiment, the solar structure is configured to facilitate using lighter, less expensive components on the upper interior structure of the building, than would be used without the solar structure.

In this context, and with momentary reference to FIGS. 13A-13D, the uplift wind load forces on the roof of an example building are illustrated with and without an example solar structure.

Figure 13A:
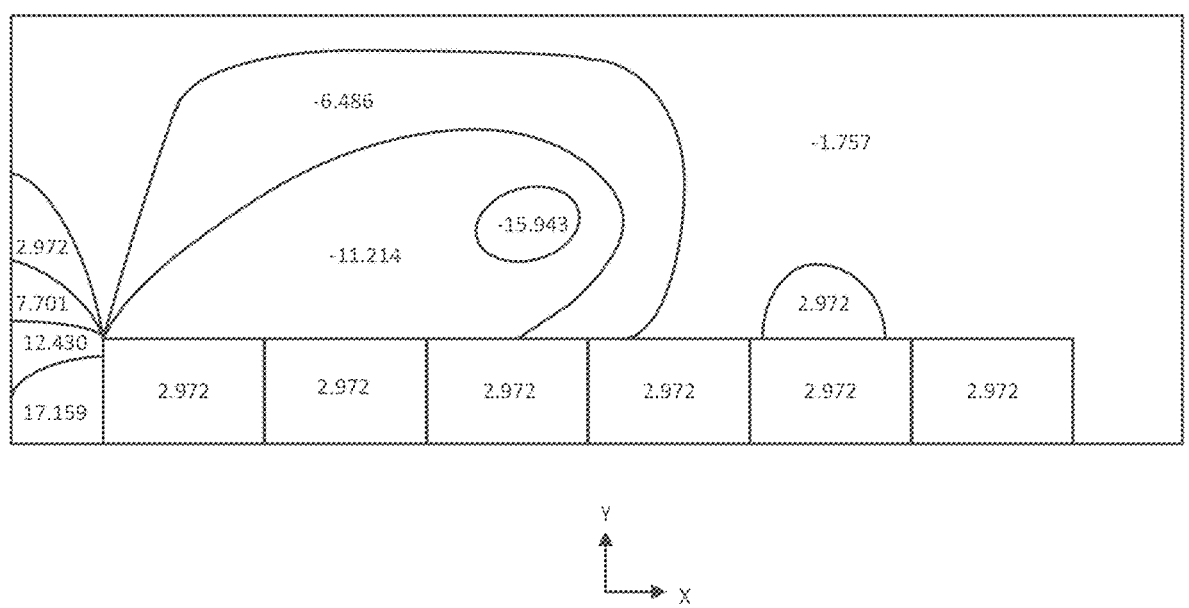
FIGS. 13A-13D illustrate the reduced stress due to wind uplift forces imparted on a building's structure after adding the elevated solar array structure to the building's design.
Figure 13B:
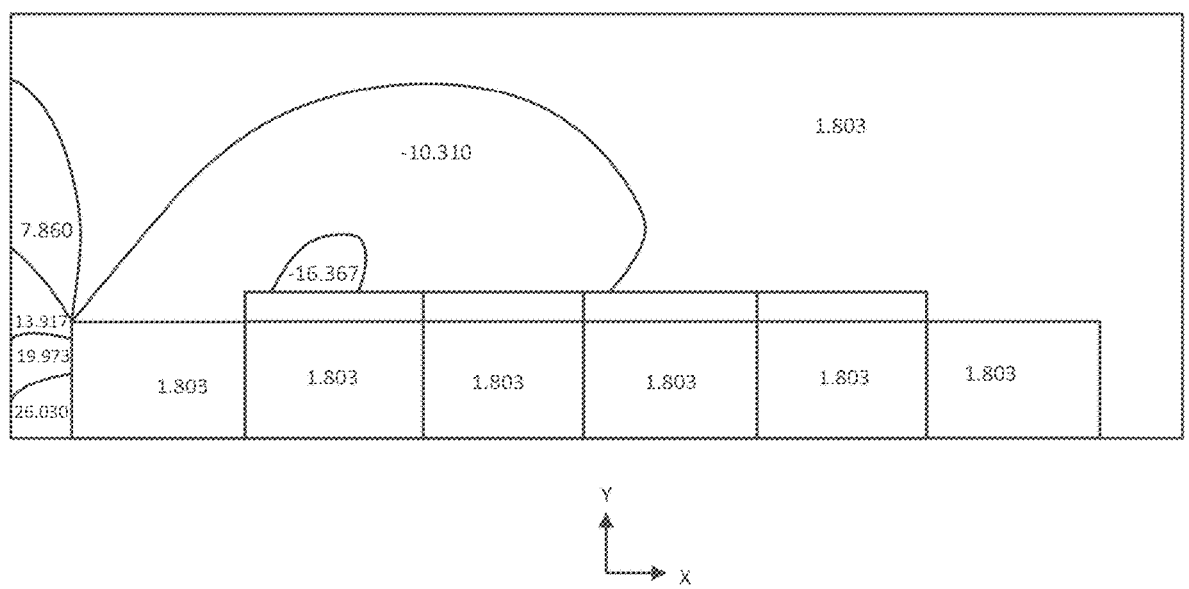
Figure 13C:
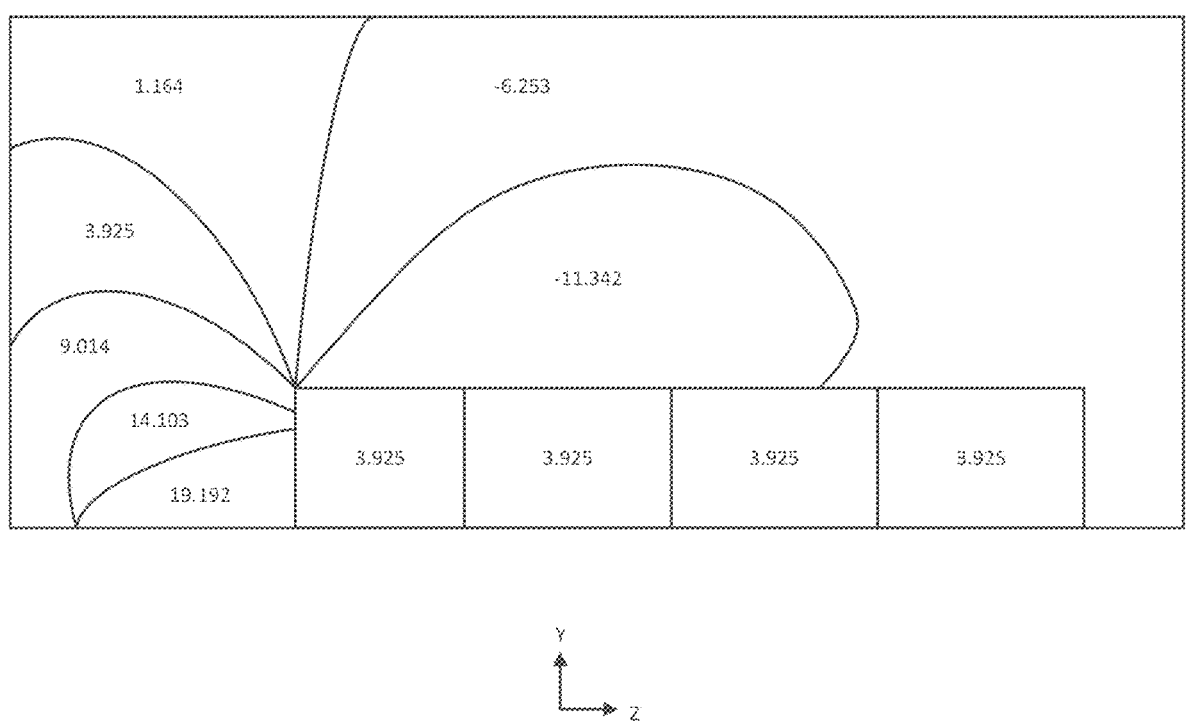
Figure 13D:
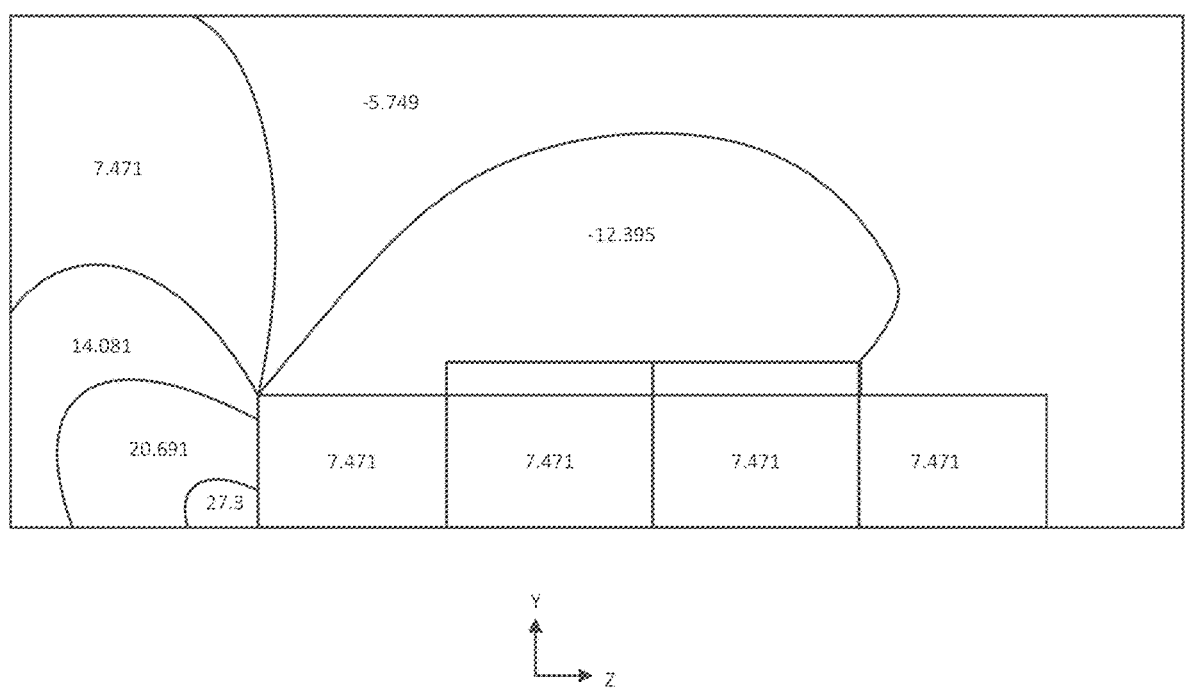

FIG. 13A illustrates the estimated wind load uplift forces on the roof of an example building without a solar structure (with the wind moving in the X direction, against the short side of the structure, and the uplift in the Y direction). FIG. 13B illustrates the estimated wind load uplift forces on the same roof with an example solar structure over that roof. Similarly, FIG. 13C illustrates the estimated wind load uplift forces on the roof of an example building without a solar structure (with the wind moving in the Z direction, against the long side of the structure, and the uplift in the Y direction). FIG. 13D illustrates the estimated wind load uplift forces on the same roof of FIG. 13C with an example solar structure over that roof.

The differences in uplift load are illustrated numerically with reference to Table 1 below. Although the numbers will change for each structure, depending on the location of the structure, the dimensions of the structure, regional wind speeds, and the like, Table 1 illustrates that the average pressure (uplift forces) on the roof can be lower when a solar structure is installed. In this example, the average pressure (due to X-direction wind) is 9.803% lower for the building with the solar structure than without the solar structure. For the Z-direction wind it is a 3.911% lower average pressure for the building with the solar structure than without the solar structure.

Wind loads, in some building designs, can drive the size of the structural members (e.g., steel beams and the like). Thus, in an example embodiment, where the uplift loads control the size of the structural member used in the internal structure of a building, and particularly for example the roof structural beams, a structural designer can reduce the size of the structural member by adding a solar structure to the roof of the building. The reduction in size is commensurate with size dictated by roof uplift forces for a roof without a solar structure compared to a roof with the solar structure. Stated another way, in an example embodiment, a method is disclosed for designing the interior support structure of a building by combining the interior support structure with a solar energy support structure above the roof consisting of columns and beams and solar panels to reduce the required strength of the support structure below the roof as compared to the required strength of the support structure below the roof without the solar energy support structure above the roof.

Figure 3:
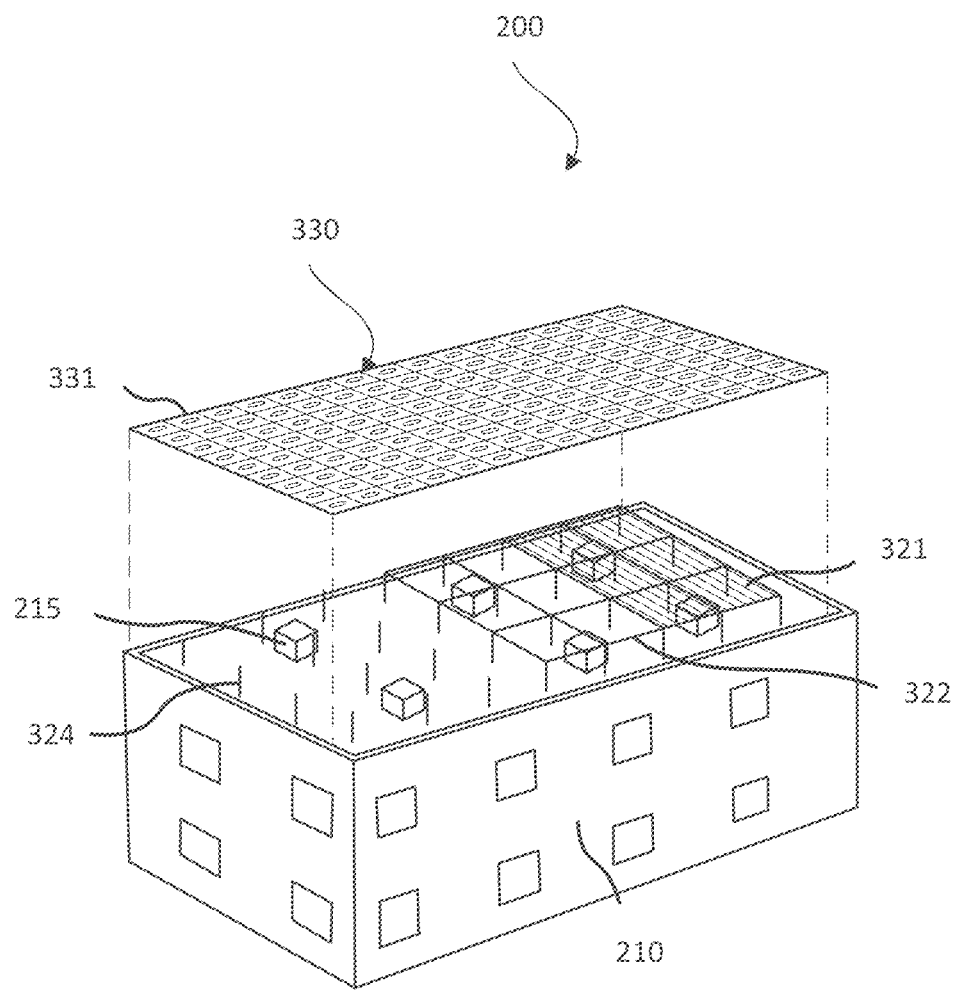
FIG. 3 illustrates an exploded view of the rooftop solar system in FIG. 2, in accordance with an example embodiment.

With reference now to FIG. 3, which illustrates an exploded view of the solar structure of FIG. 2, in accordance with an example embodiment, the building 210 may be a commercial building, a school, a warehouse, and/or any building suitable for adding a large solar panel array over the roof of the building. The building may further comprise rooftop gathering areas such as rooftop restaurants, pools, break area, patios and the like. The building 210 may further comprise rooftop equipment 215. The rooftop equipment 215 may comprise, for example, fans, air conditioners, exhaust scrubbers, electrical equipment, HVAC units, and/or the like.

Rooftop equipment that is directly exposed to the sun, and thereby subjected to the at times intense heat from the sun's radiation, will typically degrade and/or perform at a sub-optimum level. This is particularly true with the rooftop equipment that is not shaded. For example, rooftop air conditioning units operate less efficiently and with shorter lives when exposed to direct sunlight. While one could theoretically erect another roof or shade over the equipment and first roof, this cannot be done efficiently, and so it has not been a practical answer to the problem. Doing so would be expensive and/or would limit the ability to remove and add equipment.

In accordance with an example embodiment, here the solar array 331 is configured to shade most or all of the rooftop equipment 215 from direct sunlight and therefore, the solar/shade structure 200 is configured to improve the efficiency and product life of the rooftop equipment 215 by protecting it from most of the direct sunlight that would otherwise fall on the rooftop equipment 215. Thus, solar/shade structure 200 is configured to not only provide shade to the rooftop equipment 215, but to generate electricity, thus

TABLE 1

Tabulated Results from Wind Studies

| | | Wind in X-Direction | | | Wind in Y-Direction | | |
|---|---|---|---|---|---|---|---|
| | | Max Pressure (psf) | Average Pressure (psf) | Force (lbf) | Max Pressure (psf) | Average Pressure (psf) | Force (lbf) |
| Structure | Building Structure | −14.545 | −4.672 | 403,132 | −17.022 | −8.106 | 701,518 |
| Roof Frame | Building Structure with Solar Cover | −13.961 | −4.214 | 364,329 | −18.745 | −7.789 | 674,674 |
| Solar Roof Frame | Percent Difference | 4.015% | 9.803% | 9.625% | −10.122% | 3.911% | 3.827% |
| | Solar Cover Only | −13.058 | −1.88 | 46,709 | −14.154 | −2.019 | 57,976 | economically covering the rooftop equipment 215, such as air conditioning systems, to improve their efficiency and longevity.

In accordance with another example embodiment, the solar/shade structure 200 is configured to greatly reduce the amount of heat that enters the building 210 through its roof 211. Increasingly, new buildings and existing buildings that are replacing the roof materials are subject to state and local "cool roof" codes or standards that mandate solutions to reduce the heat entering the building through the roof. These standards often require the use of reflective materials to decrease radiant roof temperature (up to 50 degrees over non-reflective materials). One example is the California Building Energy Efficiency Standards for Residential and Nonresidential Buildings (Title 24, Part 6) which contains requirements for the thermal emittance, three-year aged reflectance, and Solar Reflectance Index (SRI) of roofing materials used in new construction and re-roofing projects. These cool roofing standards are designed to: reduce building energy demand by reducing air conditioning needs, improve indoor comfort in spaces not served by air conditioning, extend roof life, and contribute to reducing the urban heat island effect by reducing local air temps. These cool roof codes are likely to make the most impact on buildings with a large roof area relative to building height, such as warehouses, which make ideal candidates for cool roofing, as the roof surface area is the main source of heat gain to such buildings.

In an example embodiment, the solar/shade structure 200 is configured to eliminate the need to use reflective roofing materials, at least to the extent of coverage of the roof by the solar structure. The solar/shade structure 200 may further be configured to extend the roof life by shading the roof material from the sun's rays and reducing the radiant roof temperature. The solar/shade structure 200 may be further configured to reduce the solar radiation and heat load on the roof and thereby permit reduced R-value insulation to be specified for the roof than would otherwise be specified without the solar/shade structure 200. The solar/shade structure 200 may further be configured to extend the life of equipment on the roof by reducing exposure to the sun's rays and reducing the radiant temperature of the equipment. The solar/shade structure 200 may further be configured to allow sizing of smaller rooftop equipment (i.e., mechanical equipment such as air conditioning and evap. cooling equipment). The solar/shade structure 200 may further be configured to reduce building energy demand by shading the entire surface area (or a significant portion thereof) while also converting the sun's rays, that otherwise would have been directed to the roof, to clean PV power, thus offsetting demand from the grid. The solar/shade structure 200 may further be configured to reduce peak power demand during the hottest portions of the day by reducing energy demand and also producing maximum power output from the solar array during the hottest part of the day. Thus, the cool roof goals can be achieved better through the solar/shade structure 200 than through changing the reflective materials. Thus, in an example embodiment, the solar/shade structure 200 is configured to efficiently shade the roof so less heat enters a building through the roof. With all these benefits, the solar structure can economically be installed over the roof of the building.

In another example embodiment, the solar/shade structure 200 may cover all of or a portion of a rooftop dining area, a rooftop pool, a rooftop patio, rooftop bar or lounge, and or the like. The solar/shade structure 200 is configured, in an example embodiment to provide shade to create an enjoyable environment under which people may be inclined to more comfortably gather and socialize.

The solar/shade structure 200 may comprise solar panels 330. A plurality of solar panels 330 may be laid out in an array to form a solar array 331. In an example embodiment, the solar panels are at a fixed orientation relative to the solar/shade structure 200. In this example embodiment, the solar panels are not configured to track the sun. In this example embodiment, the solar panels can be fixed in position on purlins 321 that are supported by connecting beams 322 on top of vertical supports 324. This fixed orientation is primarily discussed herein and has advantages over tracking solar panels. For example, tracking solar panels may require more space between the solar panels to avoid self-shading and this results in a lower panel density. However, in another example embodiment, the solar panels are tracking panels mounted in any suitable manner to change their orientation relative to the solar structure. The tracking panels will typically create less shade than the fixed panels described herein because the space between tracking panels must be greater than that which can be used with fixed panels to create optimal shade. Nevertheless, the panels can be tracking or fixed orientation panels, or a combination thereof, in various example embodiments.

Thus, in an example embodiment, rooftop equipment is shaded by covering the equipment with an elevated solar panel array. For example, the solar panel array may be configured to cover one or more pieces of rooftop equipment. In an example embodiment, the sides of the solar structure are left open to allow natural airflow around the roof and cool the rooftop equipment. In an example embodiment, the structure supporting the elevated solar panel array is integral to the building support structure.

In an example embodiment, the solar panels are supported by purlins 321.

The purlins 321 may be supported by connecting beams 322. And the connecting beams 322 are supported above the roof and equipment by vertical supports 324. In an example embodiment, the connecting beams are attached to the upper portions of the vertical supports 324. For example, the connecting beams 322 may span from a first vertical support to a second vertical support. The connecting beams may span for example 20-90 feet, 30-60 feet, or preferably about 30 feet, from one vertical support to another. However, the connecting beams can be of any suitable length. In an example embodiment, the connecting beams 322 form a planar assembly of beams supported by the vertical supports. The connecting beams 322 may comprise wide-flange beams, channel iron, C beams, trusses and/or the like. Moreover, the connecting beams 322 may comprise any suitable structural members that support the purlins 321 and/or solar panels 330 and that are in turn supported by the vertical supports.

The purlins 321 may comprise, for example, rust resistant materials or have rust resistant coatings and may comprise, for example, any shape of bar stock including C, L and Z channels. Moreover, the purlins 321 may comprise any suitable structural member(s) that support the solar panels on the connecting beams. In an example embodiment, the purlins 321 support the solar panels 330. One or more purlins 321 may support one or more solar panels 330. Thus, in an example embodiment, a plurality of purlins 321 may be configured to support a plurality of solar panels 330. The solar panels 330 may be attached to the purlins 321 using suitable attachment mechanisms such as: nuts and bolts, sheet metal screws, self-tapping screws, clamps, channels or any combination thereof. Moreover, any suitable structures and attachment mechanisms may be used to support the solar panels 330 in an array above the roof, supported off of the vertical supports and connecting beams.

Figure 4:
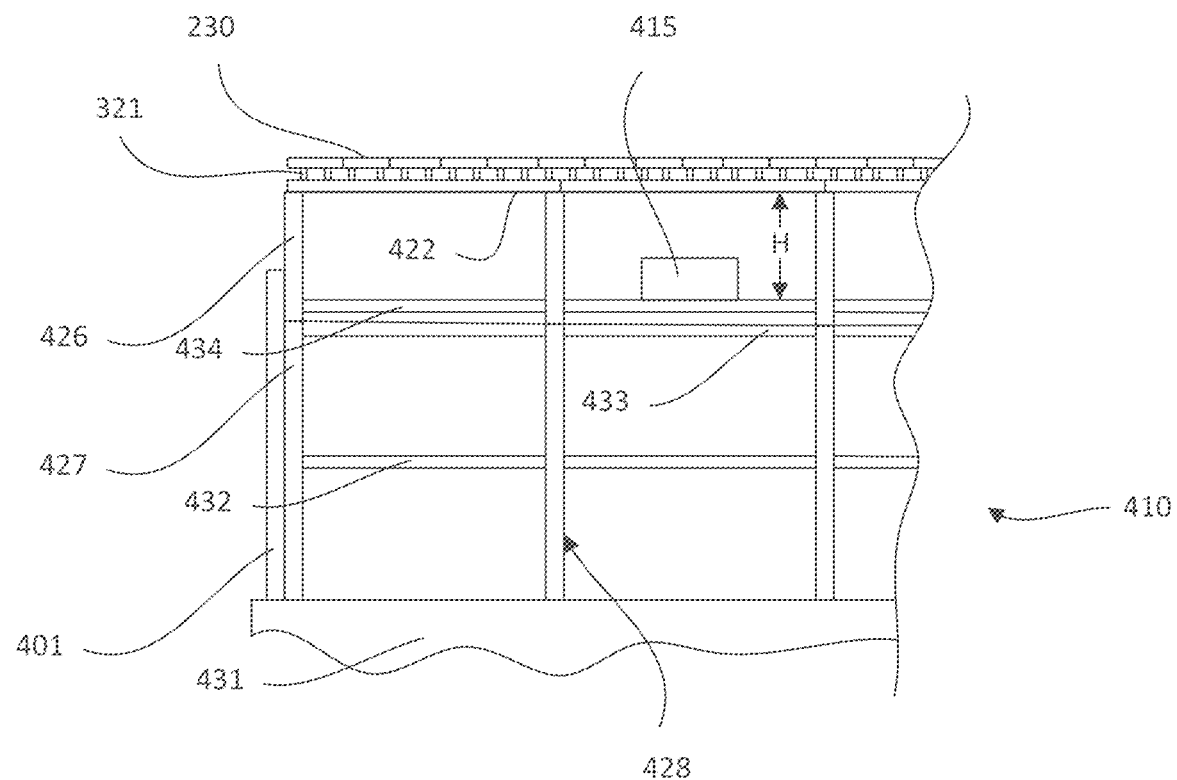
FIG. 4 illustrates a side cutaway showing rooftop equipment and a person under the solar structure, in accordance with an example embodiment.

FIG. 4 illustrates a side cutaway showing rooftop equipment 415 and a person under the solar structure, in accordance with an example embodiment. In an example embodiment, the solar panels, the purlins, and the connecting beams form a solar panel structure that is elevated above the roof of the building. In an example embodiment, the vertical supports are configured to support the connecting beams at a first height, H, above a surface of the roof of the building. In an example embodiment, the first height can be 4 to 24 feet high (preferably 4 to 20 feet high, or more preferably 7 to 12 feet high). The height may be at least sufficient to have clearance above the tallest rooftop equipment 415. In other example embodiments, the height may be at least tall enough for a person (e.g. a service person) to walk under the connecting beams. For example, the first height may be at least 7 feet tall.

In an example embodiment, the height may be measured from the surface of the roof to the lowest point of the connecting beam, as measured vertically at the location on the roof where the connecting beam is closest to the roof surface. In an example embodiment, the height of the solar structure is measured from the roof surface to the lowest portion of the solar panel vertically above that point of the roof surface. Thus, rooftop equipment 415 can be configured to be located between the connecting beams, with the top of the rooftop equipment 415 near or above the bottom of the connecting beams, but the solar panels being at least two to three feet above the rooftop equipment 415. In an example embodiment, the clearance height of the solar panels is based on manufacturer minimum clearance (or clear area) specifications. In other example embodiments, the first height may be measured from the roof's high point, the roof's low point or a middle point of the roof height. Moreover, any suitable location for measuring can be used consistent with the principles described herein. In one example embodiment, such as in FIG. 4, the roof surface and the connecting beams are parallel to each other, and the distance between the roof surface and the connecting beams is approximately constant under the elevated solar array. In other example embodiments, the roof and or the connecting beams are at an angle one to the other. For example, the solar structure can be sloped at a 5-degree angle over a horizontal roof surface, or vice versa. This is discussed in greater detail in connection with the discussion of FIG. 9, below.

In an example embodiment, the vertical support 426 is approximately 4 feet to approximately 30 feet tall between the roof and the bottom of the connecting beams, preferably between 6 feet and 20 feet tall, more preferably between 7 feet and 15 feet tall.

Raising the solar panels well above the roof is configured to cause an increase in cooling airflow over and under the solar panels. This cooling airflow causes solar collection panels to operate more efficiently by maintaining a cooler operating temperature. Also, the increased height reduces the likelihood of rooftop equipment 415 or adjacent buildings shading the solar panels. Moreover, in an example embodiment, the height H of the solar panel structure is configured to reduce the radiated heat from the solar panels onto the roof by the square of the distance between the solar panel and the surface of the roof. Thus, in an example embodiment, the average distance between the solar panels and the roof (or the equipment) is between 4 feet and 30 feet, preferably between 7 feet and 15 feet.

In an example embodiment, the solar structure can be configured to include fire sprinklers beneath the structure.

In an example embodiment, the building 410 comprises a building support structure 428. In an example embodiment, each of the plurality of vertical supports 426 is located primarily above the roof 434 of the building. In one example embodiment, the plurality of vertical supports 426 are attached directly to the building support structure 428. The building support structure 428 may comprise, for example, columns 427 and beams (or trusses) and other structural materials. For example, the columns 427 may comprise steel, concrete, and the like. In an example embodiment, a column 427 may be adjacent an outer wall 401. In one example, the building support structure may comprise a foundation 431, a middle beam 432, and an upper beam 433. The columns 427 may be supported by the foundation 431 and in turn may support the upper beams 433 and any intermediate beams 432. The roof may be supported on the upper beams 433.

In an example embodiment, the vertical support(s) 426 may be attached directly to the column 427. In in this manner the weight of the solar structure is transferred (or coupled) directly to the building support structure 428. In an example embodiment, the column 427 may be located in-line with the with vertical support 426. Stated another way, the column 427 may be located directly over the structural steel of the building support structure 428. Stated another way, the column 427 may be vertically aligned with the vertical structural support columns. Thus, the vertical support 426 may functionally direct all the weight of the solar panels, purlins and connecting beams directly through the vertical supports to the foundation, and not add load to the roof.

Figure 5:
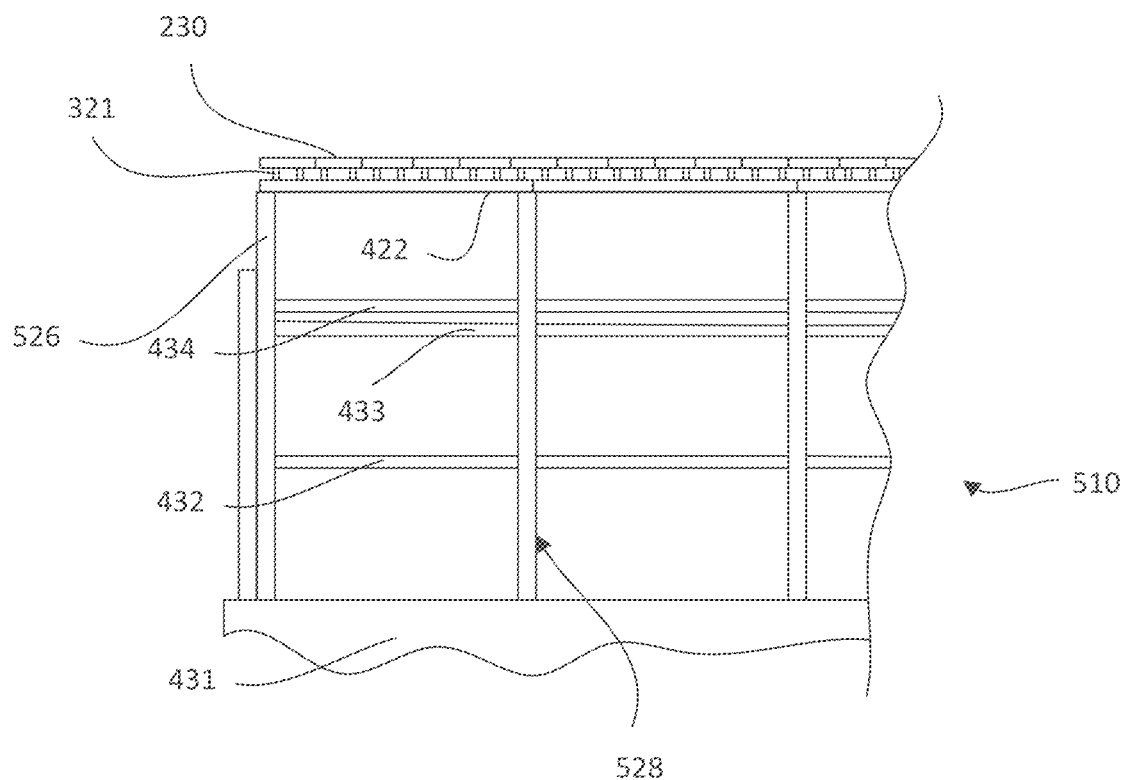
FIG. 5 illustrates a side cutaway showing extended building columns supporting the solar structure, in accordance with an example embodiment.

FIG. 5 illustrates a side cutaway showing extended building columns supporting the solar structure, in accordance with an example embodiment. In another example embodiment, the building support structure 528 of a building 510 may comprise a vertical support 526 that is one continuous column. For example, the vertical support 526 can comprise a single steel beam from the foundation 431 up to the connecting beam 422. In this example embodiment, the steel structure of the building, at the time of construction of the structure, extends upward above the roof in preparation for receiving the elevated solar array. Stated another way, the vertical support 426 can be part of a monolithic structural member, or a "common" structural member that is also part of the building structure. Alternatively, the steel structure of the building may be sized to accommodate addition of the elevated solar array structure and the first portions of the vertical supports at a later time.

Figure 6:
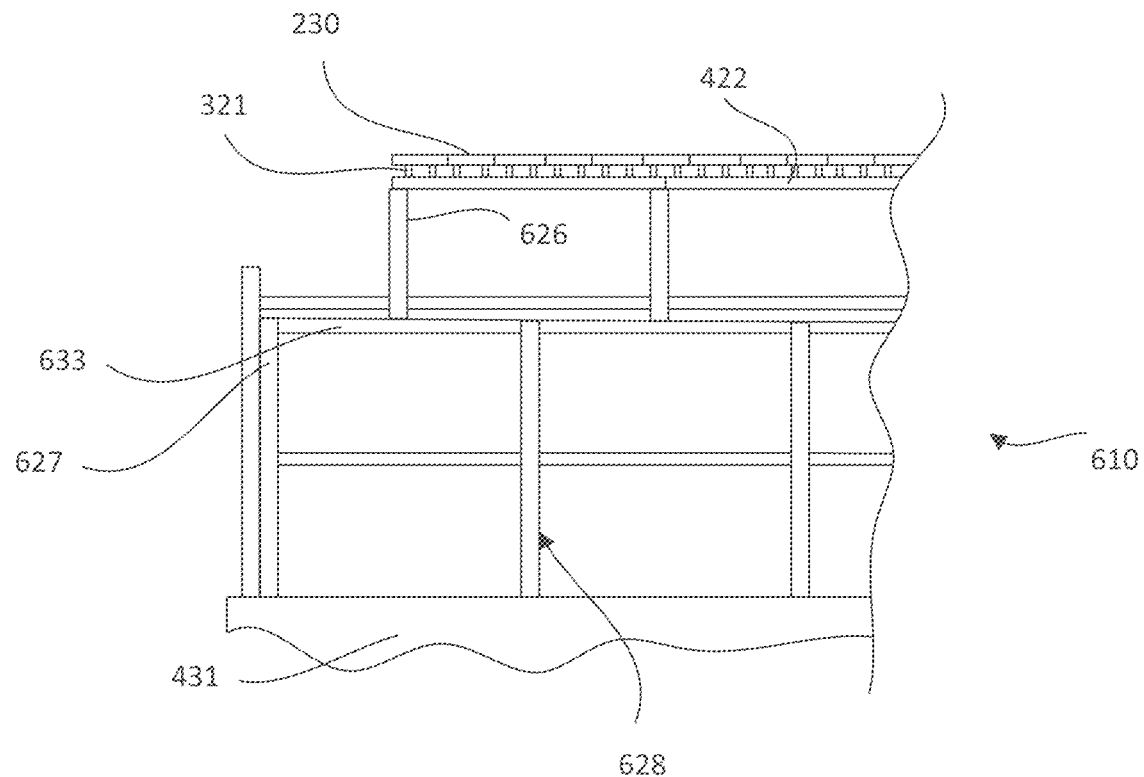
FIG. 6 illustrates a side cutaway showing solar support columns attached to the upper building beams, in accordance with an example embodiment.

FIG. 6 illustrates a side cutaway showing vertical support(s) 626 attached to an upper building beam(s) 633, in accordance with an example embodiment. In an example embodiment, a building 610 may comprise a vertical support 626 connected to a portion of a building support structure 628, such as, for example, an upper beams 633 of the building support structure 628. Stated another way, the vertical support 626 may be located out-of-line with columns 627. In this embodiment, the weight of the panels 230, purlins 321, and connecting beams 422 is transferred to the building support structure 628 through the vertical supports 626, through the upper beams 633 and through the columns 627 to the foundation 431.

In an example embodiment, the embodiments of FIGS. 4-6 can be combined in any suitable way. For example, the building and solar structure may be implemented using a combination of one or more of (i) vertical support in-line with a building support structure column (FIG. 4); (ii) continuous vertical support from the foundation to the connecting beams (FIG. 5); and (iii) vertical support connected in an offset manner to a building support structure column via a building support structure beam (FIG. 6). Thus, at least some of the vertical supports for the solar array support structure may be attached to the building's upper joists or beams. Moreover, any suitable structure can be used that supports the solar panels, purlins and connecting beams through a portion of the building structure. It is noted that this weight, in various example embodiments, is not supported by the roof.

In each of these embodiments, the number of locations where the roof barrier is interrupted is significantly reduced. In an example embodiment, there are no screw or bolt penetrations of the roof, and there are orders of magnitude fewer penetrations compared to existing rooftop systems. In an example embodiment, each "penetration" where the vertical support passes through the roof can be protected by flashing, caulking, and other standard roofing techniques. This level of protection cannot be efficiently done with state of the art roof top systems today.

In summary, the example embodiments of FIGS. 4-6 differ greatly from prior art systems for installing solar structures on rooftops. In these example embodiments, the solar structure is configured to support the solar panels over the roof without holding the solar panels to the roof by ballast (a non-ballast system), without adding any weight load to the roof, with significantly fewer roof penetrations, without compromising the roof surface, and/or without impairing the roof structure.

In accordance with various example embodiments, the solar/shade structure 200 comprises a movable portion of the solar array. In accordance with various example embodiments, a portion of the solar array is non-movable, meaning the vertical support columns, the horizontal support beams and the purlins supporting the solar panels and/or shade panels are configured to remain immovable short of disassembling the solar array. In contrast, the movable portion is a portion of the solar array that can be moved from a first position (a closed position) to a second position (an open position). In the closed position, the movable portion holds the solar panels and/or shade panels in their positions in the array of panels. In the open position, the movable portion has moved to create an opening in the solar array sufficient for passing rooftop equipment through.

The moveable portion may further be completely detachable and removable from the non-movable portion of the solar structure (referred to hereafter as a removable portion). Thus the "removable portion" is a subset or special type of "movable portion," as will be appreciated from the examples provided herein. Moreover, it will be appreciated that various of the descriptions herein in the context of a movable portion will apply as well in the context of the removable portion.

In an example embodiment, the movable portion, comprises a supporting structure (e.g., beams, purlins, associated solar panel supports and some solar panels and/or other shade panels). In an example embodiment, the purlins support the clamps or other attachment means which hold the solar panels and/or shade panels in place. In an example embodiment, the movable portion comprises more than one solar panel structurally connected to move together. Stated another way, the panels connected to the movable portion are configured to move as a single unit with the structure supporting those panels. Thus, in an example embodiment, the array of solar panels is configured to have a movable portion comprising two or more solar panels and supporting structure that all move together and move relative to a fixed portion of a solar structure.

In an example embodiment, the layout of the roof is designed so that one or more pieces of rooftop equipment are located under the movable portions. In another example embodiment, the solar/shade structure is designed so that the movable portions are located over the rooftop equipment.

Figure 7A:
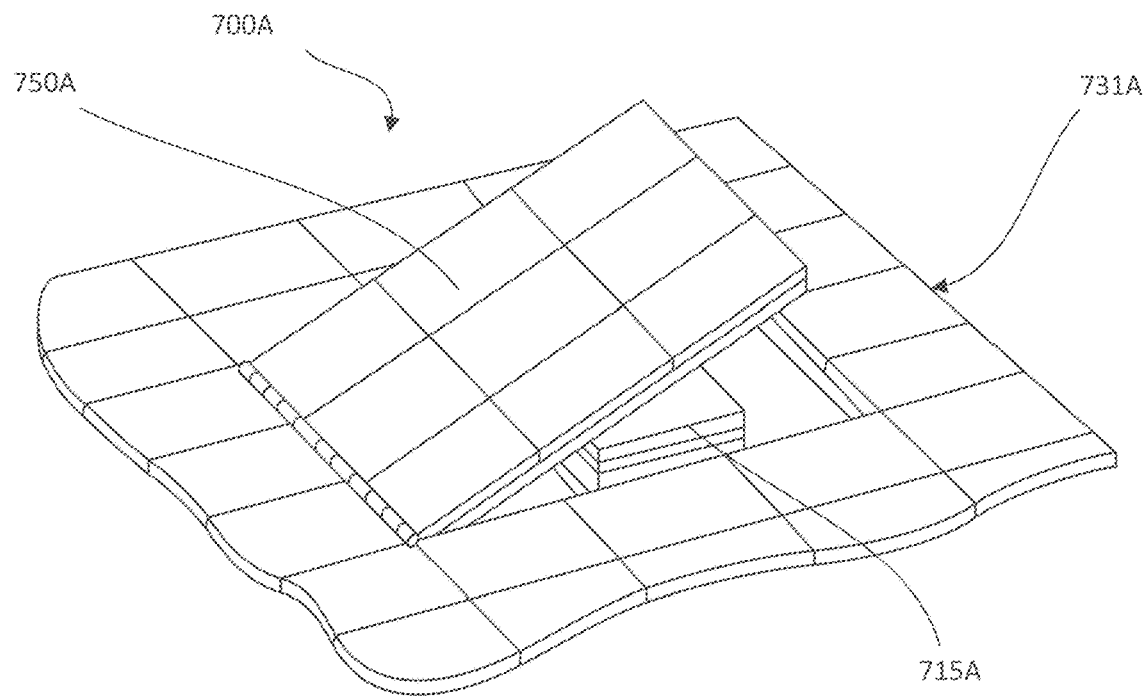
FIGS. 7A-7F illustrate, various ways to move or remove a section of solar panels from the solar panel array, in accordance with various example embodiments.

The movable portion facilitates removing and adding equipment to the roof. FIGS. 7A-7F illustrate various ways to move or remove a section of panels from the panel array, in accordance with an example embodiment. The panel array may comprise solar panels and/or shade panels, preferably having a majority of panels being solar panels. With reference now to FIG. 7A, an elevated solar array section 731A is illustrated with a movable portion 750A that is hinged. In this embodiment, the elevated solar array section 731A covers a piece of rooftop equipment 715A. The movable portion 750A is located over or near the rooftop equipment 715A. When the movable portion 750A is moved from a first position (a closed position) to a second position (an open position), the rooftop equipment 715A can be passed through the resulting opening. Thus, the movable portion 750A is sized to be large enough to pass through the rooftop equipment (or portions thereof). In an example embodiment, the movable portion is greater than 20 square feet, greater than 40 square feet, greater than 80 square feet, or greater than 120 square feet, however, the movable portion can be any size suitable for passing objects through the solar array.

Figure 7B:
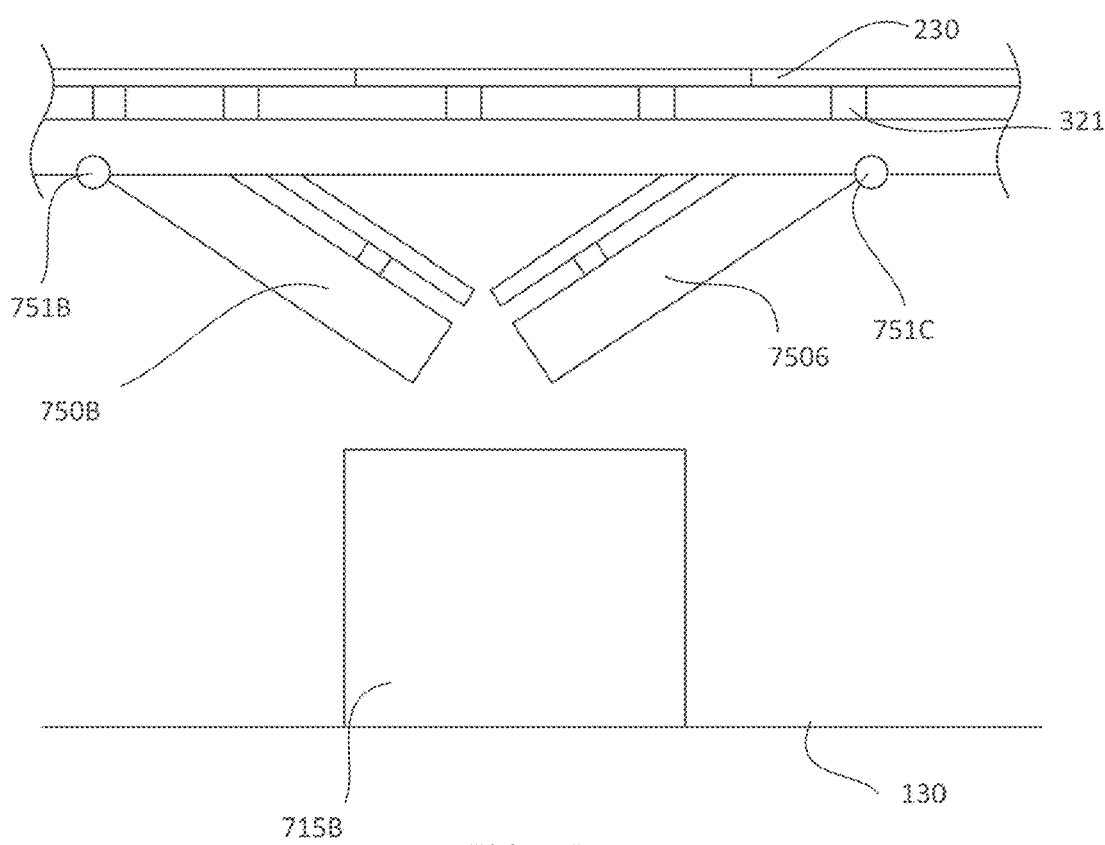

In this particular example, the solar/shade structure 200 further comprises a point of rotation 751A facilitating movement of the movable portion 750A. The point of rotation 751A may be implemented as a hinge, a pivot, a rotatable sleeve, through use of ball bearings on a shaft, or any other suitable devices that permit the movable portion 750A to swing between the open and closed position. For example, solar/shade structure 700A may comprise a point of rotation 751A for connecting the movable portion 750A to the solar array and for pivoting the movable portion 750A about the point of rotation at an edge of the opening. This is illustrated in FIGS. 7A and 7B as a hinge. In the embodiment of FIG. 7A, the movable portion 750A is configured to swing up about a hinge at the edge of the opening, however, in other example embodiments, the movable portion 750A is configured to swing down. In an example embodiment, the movable portion comprises a pivot point, and moves about the pivot point.

In accordance with another example embodiment, FIG. 7B illustrates a first movable portion 750B and a second movable portion 750C that both swing down. This embodiment could be implemented by both swinging up, in other example embodiments. In the embodiment of FIG. 7B, the first movable portion 750B swings from a first point of rotation 751B at a first edge of the opening and the second movable portion 750C swings from a second point of rotation 751C, located at a second edge of the opening. In an example embodiment, when the first movable portion 750B and second movable portion 750C are open, an opening is created over the rooftop equipment 715B, large enough to pass the rooftop equipment 715B (or portions thereof) through the opening.

Figure 7C:
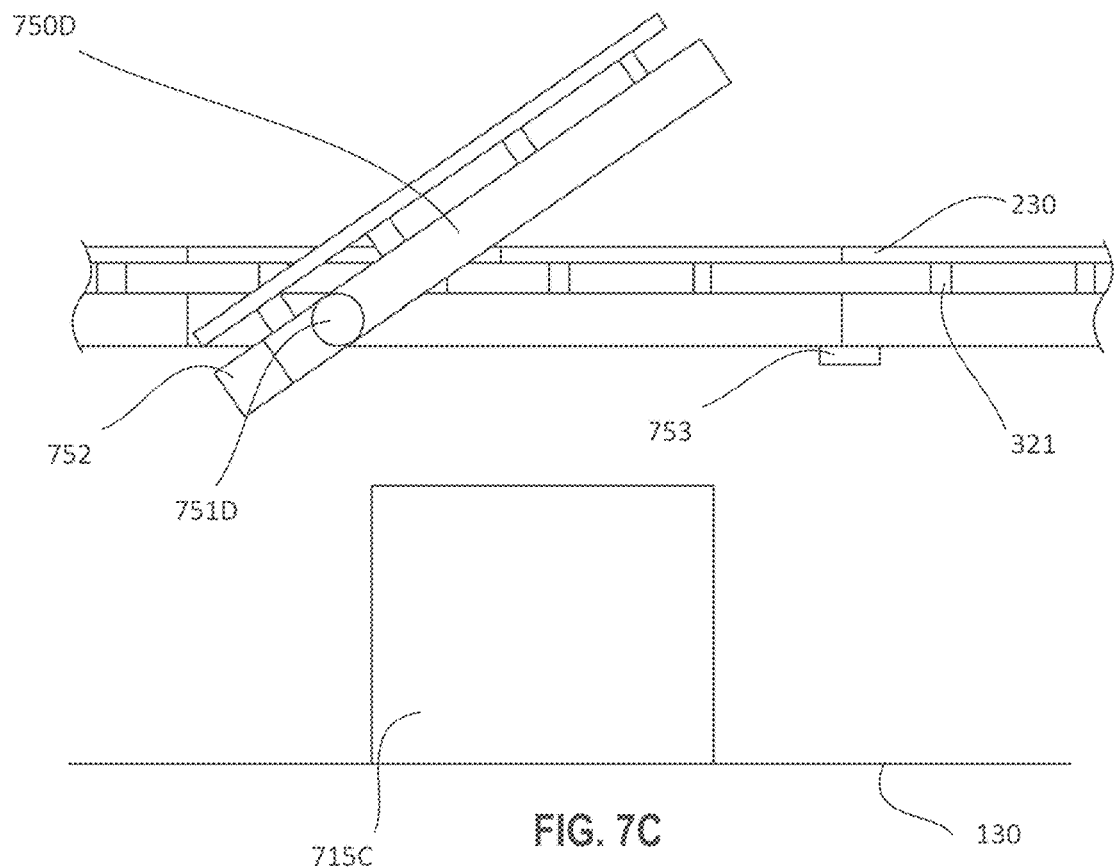

FIG. 7C, illustrates another movable portion having a point of rotation and a counterweight 752. In this example embodiment, the point of rotation 751D is located between a first side and a second side of the movable portion 750D. A counterweight(s) 752 can be provided on one side of the point of rotation to move the center of gravity closer to the point of rotation 751D. Stated another way, a counterweight 752 can be placed to cause the movable portion to swing about the point of rotation with less effort or force than without the counterweight 752. In an example embodiment, the movable portion further comprises a counter weight to counterbalance a portion of the weight of the movable portion. In this embodiment, the moveable portion 750D covers a piece of rooftop equipment 715C.

FIG. 7C further illustrates an example "stop" to limit the movement of the movable portion 750D about the point of rotation or pivot 751D. In an example embodiment, a stop 753 prevents the movable portion from moving beyond a "closed" position. In another example embodiment, a stop prevents the movable portion from opening too far. One or more stops may be employed for each movable portion. For example, a first stop and a second stop can define the range of motion of the movable portion, confining the range of motion between the two stops. In an example embodiment the stop(s) can be used in various of the other examples disclosed herein. Moreover, in one or more of the embodiments described herein, a solar/shade structure may have one or more stop, resting point, or other device for positioning the movable portion correctly in the closed position and/or for preventing movement beyond a certain range of movement. The solar/shade structure may further comprise a latch or other mechanism to hold the movable portion immovable when it is desirable to prevent the movable portion from moving. For example, the latch can prevent the movable portion from being blown by the wind or otherwise moving when unanticipated or not intentionally being moved. In another example, the movable portion further comprises a latch for latching in an open position and a latch (the same latch or a second latch) for latching in a closed position.

Figure 7D:
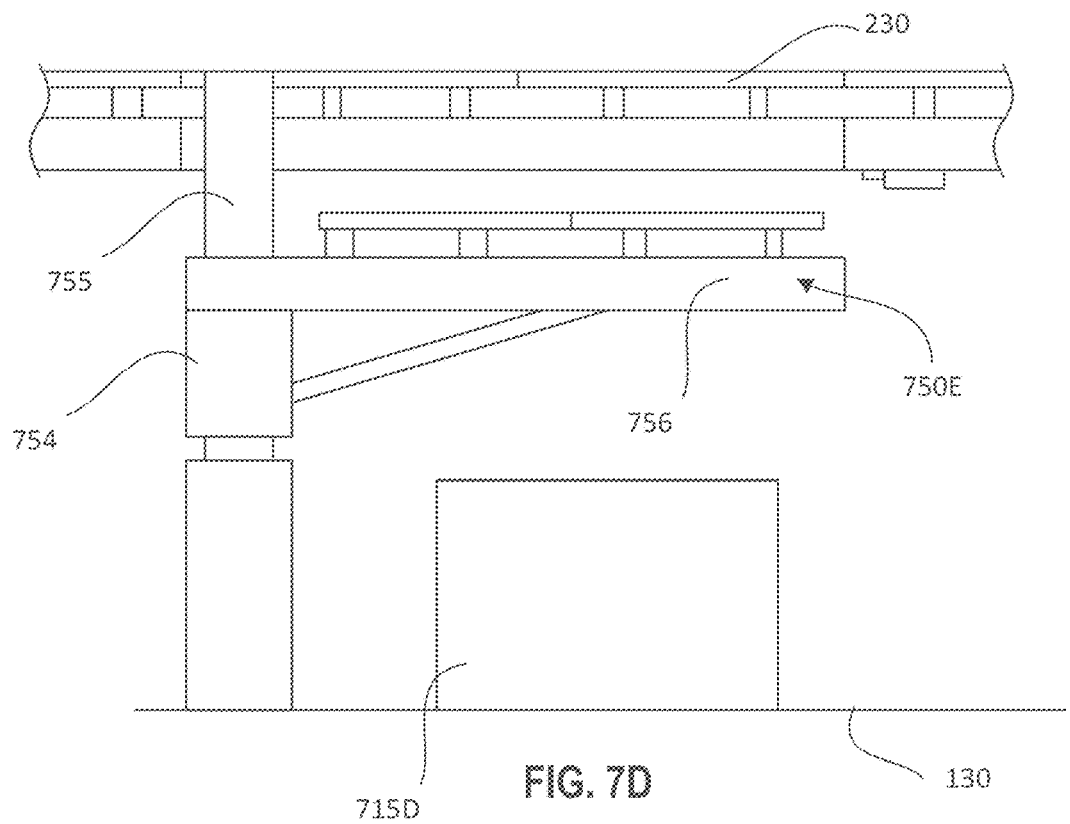

FIG. 7D illustrates a movable portion that can drop down and rotate out of the way. In this example embodiment, the solar structure further comprises a sleeve 754 for rotating about a post 755, and an arm 756 connected to the sleeve 754 on one end and supporting the movable portion 750E. The movable portion 750E is configured to be lowered out of the solar array, by sliding the sleeve 754 down relative to the post 755. Then the movable portion 750E is configured to be swung out of alignment with the opening in the solar array that it just created when lowered, by rotating the sleeve 754 relative to the post 755. In this embodiment, the moveable portion 750E covers a piece of rooftop equipment 715D.

Figure 7E:
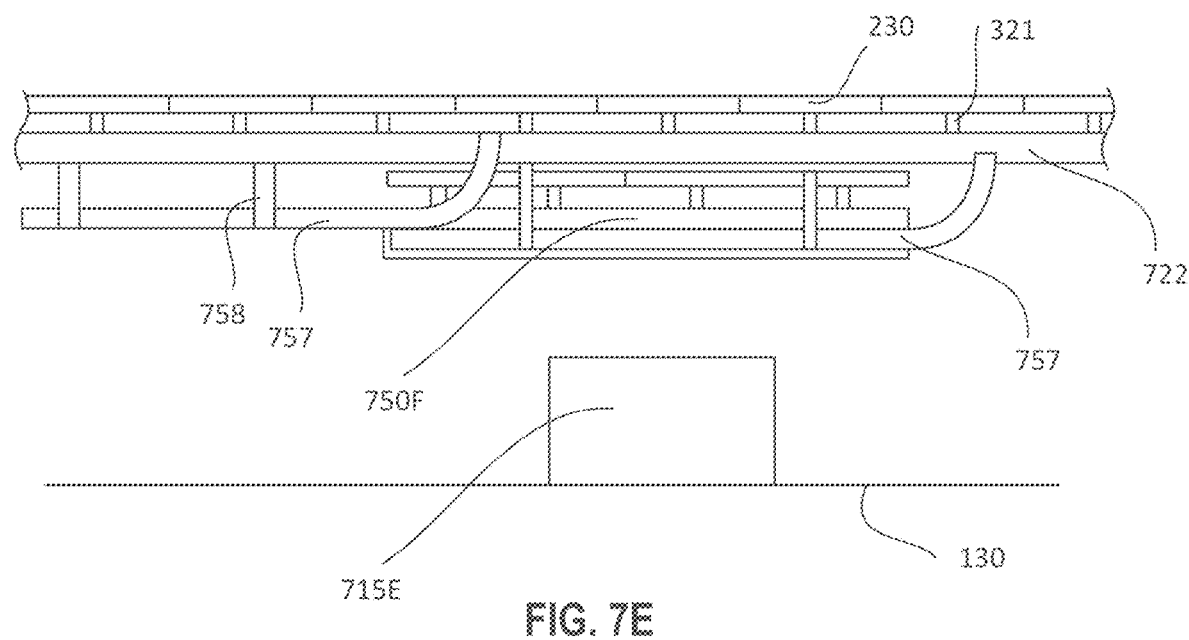

In yet another example embodiment, FIG. 7E illustrates a movable portion 750F that rolls on a track, like a garage door from a first position (a closed position) to a second (open position). In an example embodiment, the second position is down and to one side of the opening. The movable portion 750F comprises rollers that are configured to roll on a track 757. The tracks 757 may be supported by being connected to the connecting beams 722 by track hanger 758. The movable portion 750F is configured to move from the second open position to the first closed position to return the movable portion 750F into the solar array. Thus, in an example embodiment, all or portions of the movable section are mated with rollers and tracks to roll the movable section between the opened position and the closed position. In this embodiment, the moveable portion 750F covers a piece of rooftop equipment 715E.

Figure 7F:
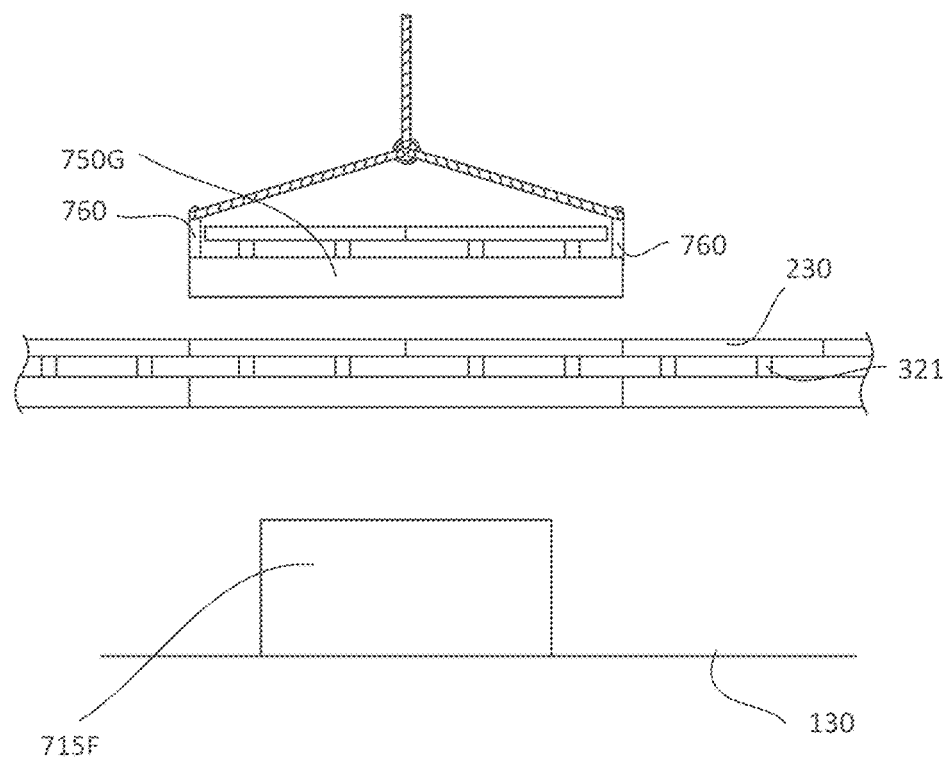

In yet one other example embodiment, FIG. 7F illustrates a movable portion 750G that is configured to be lifted out of the opening by a crane or similar lifting device. In this example embodiment, the movable portion 750G is configured to be completely detached from the solar array. Thus, as described above, the movable portion may comprise a removable portion. The removable portion can be removed and lifted away from the solar structure by a crane cable or the like. In one example embodiment, the removable portion 750G comprises attachment points or cable connection posts 760 for connecting the crane cable or strap to the removable portion 750G in a sturdy, consistent, secure, and predictable manner. Moreover, in another example embodiment, the removable portion 750G comprises feet on the bottom of the movable portion 750G, for setting the movable portion 750G on the ground or other surface while disconnected from the solar array. This can help keep the solar panels from being broken or damaging the underside of the movable portion, protecting the supporting beams, purlins, and solar panels from dirt, debris, mud, standing water, and projecting items on the ground. In an example embodiment, the removable section can be removed from and later reattached to the main solar array structure. In this embodiment, the moveable portion 750G covers a piece of rooftop equipment 715F.

The removable section may comprise, in one example embodiment, a frame that is independent of the rest of the solar structure frame. In the various example embodiments, the movable portion may be configured to have added bracing, cross-bracing, rigidity or support (compared to other portions of the support structure of the solar array) to reduce the bending or flexing that might otherwise occur when moving the movable portion. For example, the movable portion may comprise more bracing added to the beam assembly below the purlins (to avoid any torqueing or bending stresses being transferred to the solar panels) than is added to the immovable portion of the solar structure. In this manner the solar panels, other equipment, or the structure itself is less prone to breaking due to the movements when removing the removeable portion. Thus, in an example embodiment, the movable portion is sufficiently strong within itself that the two or more solar panels on the movable portion will not break when the movable portion is moved.

In an embodiment, panels 230 may be attached to the moveable portion, preferably solar panels 330. In an example embodiment, the solar panels on the movable portion are wired to another portion of the solar/shade structure with wire length(s) sufficient for movable portion to move through the designed range of motion without putting stress on the wires. In an example embodiment, the movable section is configured to stay electrically connected even when moved from the first position to the second position. For example, electrical wiring can include additional length(s) of wire to facilitate the movement of the movable portion. In another embodiment, the solar panels on the movable or removable portion are wired to another portion of the solar/shade structure in a disconnectable manner so that the solar panels can be unplugged from the solar/shade structure when they are being moved as part of the movable/removable section. In another example embodiment, the movable section is plug and play and is configured to easily disconnect from the rest of the electrical system before moving and reconnect when repositioned in the solar array.

In an example embodiment, the solar/shade structure comprises a locating structure comprising, for example, a structure on the removable portion which mates with a corresponding structure on the main solar array structure. This locating structure is configured to aid in alignment of the removable portion when it is put back in the opening, and/or to facilitate correct orientation of the removable portion on reinsertion into the array. Moreover, any suitable locating structure may be used to move the movable portion to create (and later close) an opening above the rooftop equipment.

In an example embodiment, non-solar energy producing panels are added to fill some or all of the areas not filled by solar panels in some or all of the movable/removable sections and/or in a portion or portions of the solar/shade array to provide shade to the roof and/or rooftop equipment.

In an example embodiment, the structure supporting the elevated solar panel array has movable or removable portions to facilitate the service and/or replacement of rooftop equipment.

Figure 8:
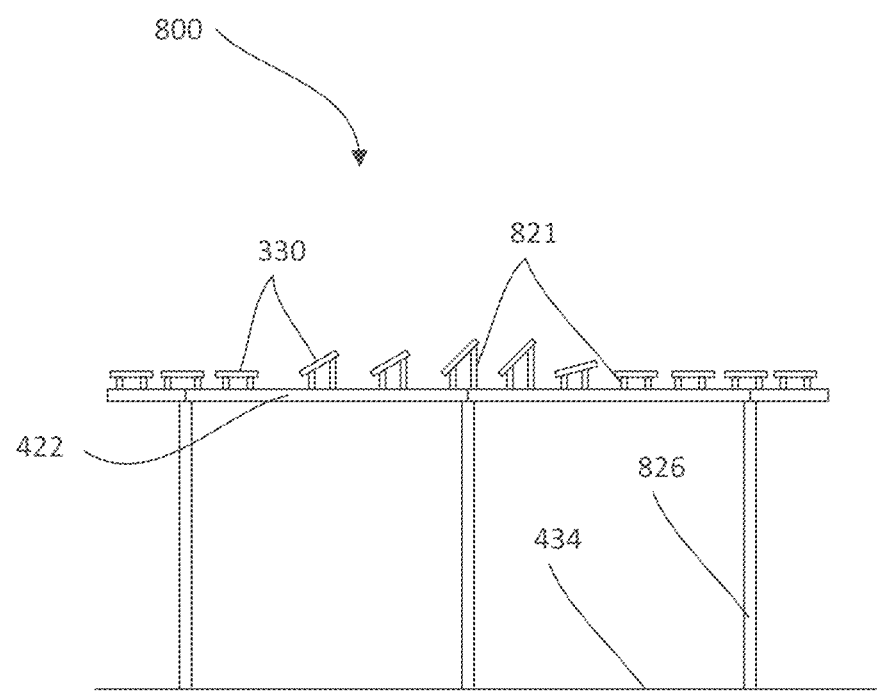
FIG. 8 illustrates a side view of a solar array structure and the solar panels at various fixed angles, in accordance with an example embodiment.

FIG. 8 illustrates a side view of a solar array structure and the solar panels at various fixed angles, in accordance with an example embodiment. In an example embodiment, solar panels 330 may also be installed on solar structure 800 in a non-uniform manner. The solar structure 800 comprise vertical supports 826 and connecting beams 422. For example, solar panels 330 may be installed at some or all of the available installation locations on solar structure 800 at different angles and directions. In an example embodiment, some panels may be oriented horizontally and other panels may be oriented at an angle to horizontal. A group of panels may be arranged such that they are relatively parallel with the ground so that they receive sunlight during mid-day, when the sun is overhead and the intensity of the sunlight is highest. It is noted that the horizontal panels are located close together, while the angled panels are located with more space between the angled panels, sufficient to avoid self-shading. The solar panels 330 may also be arranged in varying directions and at varying angles by structural module, such that the orientation of a first group of solar panels are consistent across a portion of the solar structure 800, and the orientation of a second group of solar panels are consistent across a different portion of the solar structure 800, but the orientation of the first group is different from the orientation of the second group. Moreover, the angles of the solar panels may be different from each other within the same group.

In other example embodiments, the solar panels 330 may be located on supports, e.g., purlins 821. In various embodiments, solar panels 330 may be positioned at varying angles between approximately 0 degrees and 10 degrees. In some embodiments, these angles and the orientation of the panels may depend on whether the location is in the Northern or Southern hemisphere, and the distance from the equator. In one embodiment, solar panels 330 may be fixedly positioned at varying angles between approximately 0 degrees and 5 degrees, inclusive. In another embodiment, solar panels 330 may be positioned at approximately 2 degrees. In another embodiment, solar panels 330 may be positioned at approximately 0.5 degrees. In another embodiment, solar panels 330 may be positioned at approximately or exactly 0 degrees.

In typical solar panel arrays, solar panels placed at the optimal angle for efficiency per panel do not generate the optimum energy for the structure nor the most consistent shade on the roof and rooftop equipment. As such, in an embodiment, solar structure 300 may comprise solar panels 330 placed between approximately 0 degrees and approximately 10 degrees (relative to horizontal) in order to provide adequate shade in the summer. Further, solar panels 330 placed at angles between approximately 0 degrees and approximately 10 degrees (relative to horizontal) will allow more rows of solar panels 330 and generate more energy than structures with panels placed at steeper angles. As such, solar shade structures in fixed spaces may be best served with panels place at angles of 0° to 10° (relative to horizontal) for two reasons; increased revenue from energy collected and increased shade provided in the summer months. In an example embodiment, solar structure 300 comprises horizontal panels to generate the most consistent shade.

In an example embodiment, the energy generation per square foot of the overall solar panel structure (as opposed to per square foot of panel) increases with a decrease in the angle from 10 degrees to 0 degrees (relative to horizontal). This is counter intuitive because, in Phoenix, the efficiency of an individual solar panel will go down as the angle is reduced from 10 degrees to 5 degrees. But this improvement in energy generation density is due to the ability to add rows of panels with the lower angle of the panels due to less self-shading from the panel in front, allowing a greater panel density even while decreasing the efficiency of individual panels. In an example embodiment, the solar panels can be mounted parallel to or at an angle to the solar panel support structure (or to horizontal) in order to maximize the benefit to the building whether it be by maximizing the energy produced, by maximizing the shade provided or by maximizing some other benefit or combination of benefits.

In an example embodiment, the solar array structure is configured to be parallel to roof surfaces, whether the roof surfaces are essentially flat or at an angle relative to horizontal. Moreover, the solar array structure may be configured to have a degree of tilt relative to horizontal where this degree of tilt is independent of the angle, slope or specific elevation of the roof surface or portion of the roof surface.

Figure 9:
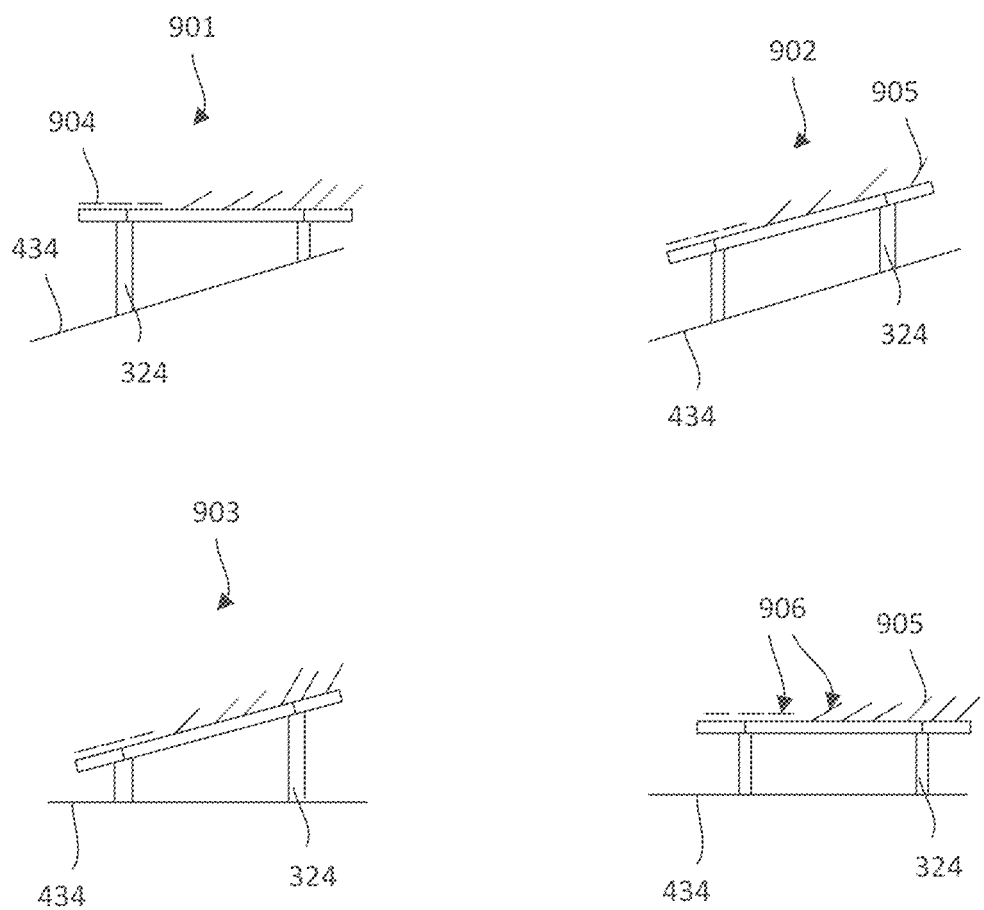
FIG. 9 illustrates various relative angles of roofs, solar panels and support beams, in accordance with an example embodiment.

FIG. 9 illustrates various relative angles of roofs, solar panels and support beams, in accordance with an example embodiment. In one example embodiment, see 901, the solar structure comprises vertical support columns that project above the roof by amounts such that the tops of the columns are at the same elevation so that the solar array structure is horizontal regardless of the amount of tilt or elevation of the roof or varying amounts of tilts or elevations in different locations of the roof. In another example embodiment, see 902 and 903, the solar structure comprises vertical support columns that project above the roof by amounts such that the tops of each row of columns are at increasingly lower elevations in one direction so that the solar array structure is uniformly tilted by some amount in one direction regardless of the amount of tilt or elevation of the roof or varying amounts of tilts or elevations in different locations of the roof. In an example embodiment, the tilted solar array structure is tilted in the direction of the equator or in a direction other than towards the equator, and/or parallels or does not parallel the roof surface or surfaces. In another example embodiment, the solar structure comprises vertical support columns that project above the roof in such a manner that one section of the solar array structure is tilted in one direction and another section (or other sections) is tilted in a different direction or by a different angle of tilt.

In another example embodiment, the solar panels are mounted parallel to the solar array structure regardless of the tilt of the structure. See 904. In another example embodiment, the solar panels are mounted so that the panels' surfaces are at an angle to the solar array structure regardless of the tilt of the structure. See 905. In this example embodiment, the solar panels (e.g., 904, 905) are mounted so that the panels' surfaces are at the same angles relative to the solar array structure, or the solar panels are mounted so that the panels' surfaces are at differing angles relative to the solar array structure. See 906.

In one example embodiment, the solar panels are mounted horizontally or nearly horizontally in a rooftop solar array system to maximize the number of solar panels on the roof and thereby maximizing the amount of energy generated per square foot of roof. In another example embodiment, the solar structure is configured to consistently provide a high percentage of shade over the equipment and the roof regardless of the time of day or time of year by mounting the solar panels in such a manner that they are horizontal and closely spaced with minimal gaps between the panels. In an example embodiment, the solar panels are mounted at an angle to the surface of the solar array structure. In another example embodiment, the solar panels are mounted parallel or nearly parallel to the roof's surface to minimize their visual impact from the ground and to maximize the number of solar panels on the roof. In another example embodiment, the solar structure is configured to consistently provide a high percentage of shade over rooftop equipment and the roof regardless of the time of day or time of year by mounting the solar panels in such a manner that they are parallel to the roof's surface and closely spaced with minimal gaps between the panels. In an example embodiment, the solar array structure or the solar panels or both are at angles that are independent from the roof's surface. In another example embodiment, the solar panels of an elevated rooftop solar array are separated with a small gap to allow water to easily drip off the solar panel and to reduce the wind lift on the structure. For example, the small gap may be from 0.5 inches to 4 inches, or from 1 inch to 2.5 inches, on some or all sides; however, any suitable gap can be used.

Figure 10:
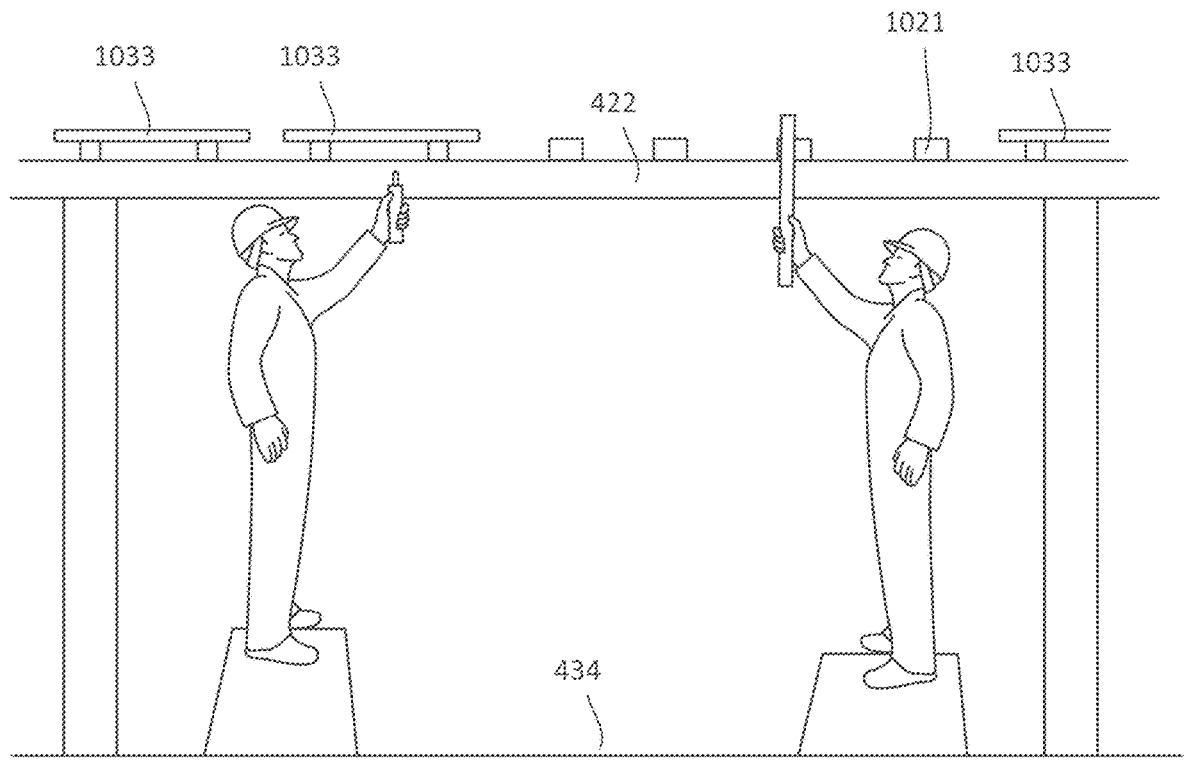
FIG. 10 illustrates the positioning and attaching of solar panels from underneath the structure.

FIG. 10 illustrates the positioning and attaching of solar panels from underneath the structure. In an example embodiment, solar panels 1033 are attached, removed and serviced from underneath the solar panels. In an example embodiment, the majority of, or all, panel attachment devices and support mechanisms of solar collection panel can be installed, accessed and operated from below the panels. In an example embodiment, solar panels 1032 can be removed from below and replaced with different and/or more efficient panels. The solar panels can be attached with any suitable attachment devices such as screws, clamps, bolts, etc. that are suitable for accessing and attaching, removing and servicing from below the solar panels. However, in other example embodiments, the solar panels can be attached or detached from above the solar panels.

In an example embodiment, a worker standing below the solar panels, as illustrated in FIG. 10, can lift a solar panel up through the beams and purlins, rotate the panel 1033 and place the solar panel in its proper location, and attach the solar panel to the purlin 1021 or other such panel support structure. The solar panel can be attached in place, from beneath the solar panels, using clamps, screws, nuts and bolts, and the like. Similarly, a worker standing below the solar panels can detach the solar panel from the purlin etc. by operating the attachment mechanism from below the solar panels, such as by unclamping, unscrewing or unbolting the solar panel from the purlin. The panel 1033 can then be rotated and lowered through the opening created by detaching the solar panel(s). Thus, the solar structure facilitates maintenance of the panels without access aisles or cranes.

Moreover, the ability to access and service solar panels 330 from underneath the solar structure facilitates greater panel density because access from the top of the structure would require access lanes or aisles from which panels could otherwise be installed. Further, in a roof-mounted installation the roof mounting structure and the roof itself may make access from the bottom of the panel impractical. Thus, in an example embodiment, solar/shade structure 200 comprises a supporting structure that does not restrict the ability to remove and install solar panels 330, and/or similarly does not comprise access lanes. Moreover, the supporting connections and circuitry required to use the energy created by solar panels 330, including for example, an inverter(s) and batteries may be located under and shaded by modular structure.

In another exemplary embodiment, solar/shade structure 200 comprises one or more sections of the structure configured to either move or rotate up or down or may be removed entirely to allow a person to move up through the solar/shade structure 200 to clean, service or inspect solar panels 330 and shade panels.

Solar panels 330 may comprise any suitable type of solar panel. In an example embodiment, solar panel 330 is any device or apparatus configured to receive sunlight and generate electricity. In one embodiment, solar panel 330 is a photovoltaic solar panel. Solar panel 330 may be of any suitable size, including for example, a 6.4 foot by 3.25 foot panel. In an example embodiment, the solar panel 330 is a glass-on-glass photovoltaic module. In an example embodiment, the solar panels describe herein may also be described as photovoltaic modules. In one example embodiment, the solar panels are rimmed panels. In an example embodiment, the solar panel 330 is configured to provide shade to objects below the solar array.

In an example embodiment, the energy generated from the elevated solar panel array can be used to offset the building's immediate energy requirements or to be directed first to one or more batteries to store the energy for later use. For example, the energy stored in the batteries can be used for electrical load shifting or for electrical peak shaving, or both. Moreover, the batteries may be used for any suitable purpose. In an example embodiment, the solar structure comprises an electronic control system to link the electrical output of a contiguous rooftop solar array whose structure is integral to the building support structure to a battery system and to a building's main electrical line. In an example embodiment, the control system uses the energy generated by the solar array to charge the batteries until they are full and then diverts the energy generated by the solar array to the buildings main electrical line. In an example embodiment, the output of a contiguous rooftop solar array, the structure of which is integral to the building support structure, is linked to the battery and or electronic control system.

Moreover, the solar/shade structure 200 may further comprise one or more non-solar panels, or "shade panels" located in the array. In some cases, shade panels may be used to reduce the amount of energy collected to balance the energy generation with the energy needs of the building. In other cases the shade panels can be used to fill out an array after the number of solar panels required to generate the desired amount of energy have been installed. In another example, the shade panels can be used to reduce the cost of the array. In another example, shade panels may be used to fill in gaps where solar panels do not fit conveniently due to their fixed sizes. Specifically, a moveable section may be located relative to the fixed portion such that a space is created between the movable section and the solar panels in the array where, for example, only ½ of a solar panel would fit. Shade panels of whatever size is required can be used to fill those gaps. In another example, the shade panels can be used to create a pattern such as a logo or a symbol within the solar array.

Figure 11:
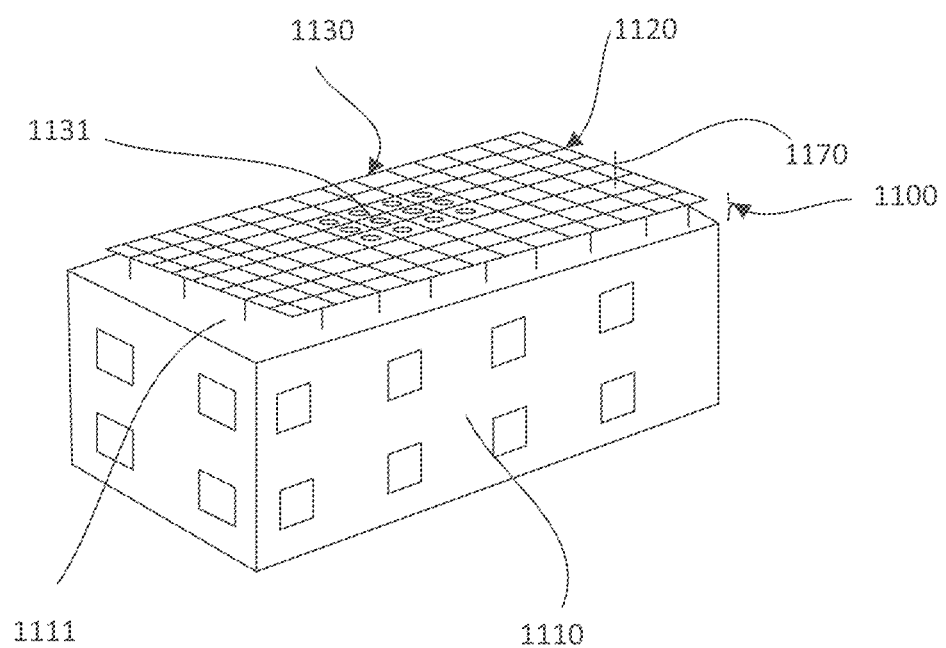
FIG. 11 illustrates a building with a solar structure having some of the solar panels removed to allow antennas to project through, and some spaces for solar panels covered instead by other types of panels.

FIG. 11 illustrates a building with a solar structure having some of the solar panels removed to allow antennas to project through, and some spaces for solar panels covered instead by other types of panels, in accordance with an example embodiment. In this regard, a building 1110 has an elevated solar array comprising an array of panels. In an example embodiment, some of the panels are solar panels 1130 and some of the panels are shade panels 1131. In an example embodiment, the solar/shade structure 1100 provides shade to a roof 1111 of a building 1110. The shade may be provided by solar panels 1130 and shade panels 1131 laid out in an array supported by a solar array support structure 1120.

In accordance with an example embodiment, some of the panels are removed from the array to permit an antenna 1170 to extend through the elevated solar array to communicate wirelessly. In another example embodiment, a section of solar panels is removed to facilitate a satellite dish (not shown) having a clear view through the elevated solar array to communicate with intended satellites.

Figure 12:
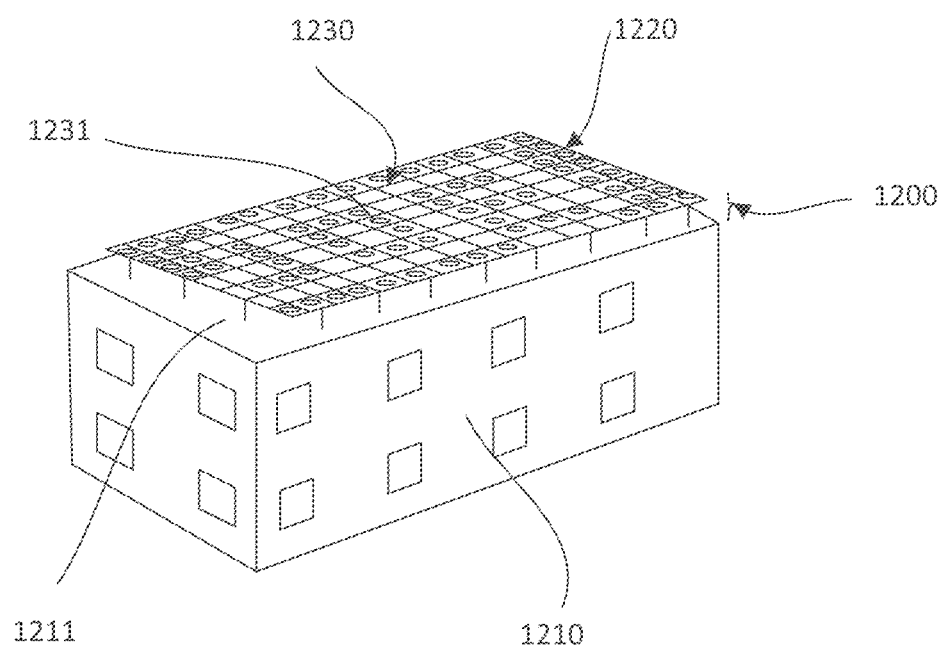
FIG. 12 illustrates a perspective view of a rooftop solar system on a building with a design formed by the solar panels.

FIG. 12 illustrates a perspective view of a rooftop solar system on a building 1210 with a design formed by the solar panels 1230. FIG. 12 illustrates a rooftop solar shade structure 1200 having solar panels 1230 and shade panels 1231, in an example embodiment. In an example embodiment, the solar/shade structure 1200 provides shade to a roof 1211 of a building 1210. The shade may be provided by solar panels 1230 and shade panels 1231 laid out in an array supported by a solar array support structure 1220.

In an example embodiment, shade panel 1231 may be any device or apparatus configured to provide shade. Shade panel 1231 may be made of any suitable material, including for example, a textile, wood, metal, plastic, or any other suitable material capable of providing shade. In one embodiment, shade panel 1231 may be an artistic element. Shade panel 1231 may be opaque or translucent. Shade panel 1231 may also comprise one or more colors. Shade panel 1231 may also include a design element. This design element may be visible from above or below solar/shade structure 200. Moreover, in an example embodiment, the design elements are arranged to create visual creative works, messages, and/or art. In an example embodiment, the shade panels, and/or the absence of panels can be used to spell out a word, display a logo, or create an artistic design. In an embodiment, shade panel 1231 may be the same size or half the size of solar collection panel 1230. Shade panel 1231 may also be proportionally sized such that it may be installed in the solar array with solar panels 1230 to provide an aesthetically pleasing appearance. In one embodiment, shade panel 1231 may be any suitable size. In another embodiment, solar panels of different colors can be used to form a pattern such as a logo or symbol within the solar array.

Solar panels 1230 may be installed on solar structure 1200 in a uniform manner. For example, solar panels 1230 may be installed at every installation location in an array of solar panels. Similarly, solar panels 1230 may be installed in a non-uniform pattern at particular installation locations on solar structure 1200. For example, solar panels 1230 may be arranged in a particular fashion to display a logo that can be viewed from above the structure.

In accordance with various example embodiments, a method of servicing or replacing rooftop equipment may comprise the steps of: electrically disconnecting the removable solar panel array section from the rest of the solar panel array and/or from its associated electronics; removing the bolts (or other attachment means) that attach the removable solar panel array structure section to the rest of the solar panel array structure; using a crane (or similar lifting device) to first lift off the removable solar panel array structure section of the solar array and set it down in a safe place and then to lift the rooftop equipment to be replaced through the open space from the recently removed solar array section; using a crane to lift the replacement rooftop equipment through the open space from the recently removed section and then to place the removable solar panel array structure section of the solar array back into its proper place; replacing the bolts (or other attachment means) that attach the removable solar panel array structure section to the rest of the solar panel array structure; and electrically reconnecting the removable solar panel array section from the rest of the solar panel array and/or from its associated electronics. Other similar steps may be employed consistent with this disclosure.

In accordance another example embodiment, a method of servicing or replacing rooftop equipment may comprise: electrically disconnecting the removable solar panel array section from the rest of the solar panel array and/or from its associated electronics; removing the bolts (or other attachment means) that attach the removable solar panel array structure section to the rest of the solar panel array structure; moving the solar panel array section, that is located over the equipment to be replaced or serviced, out of the way so a crane (or similar lifting device) can have direct access to the rooftop equipment; using a crane (or similar lifting device) to lift the rooftop equipment through the open space created by moving the movable solar array section; using a crane to lift the replacement rooftop equipment through the open space created by moving the movable solar array section; moving the movable solar panel array structure section of the solar array back into its proper place; replacing the bolts (or other attachment means) that attach the movable solar panel array structure section to the rest of the solar panel array structure; and if previously disconnected, then electrically reconnecting the movable solar panel array section to the rest of the solar panel array and/or to its associated electronics. Thus, in an example embodiment, the removable section comprises an electrical disconnect for disconnecting a group of solar panels of the removable section from the rest of the solar structure when the removable section is removed from the solar structure.

In an example embodiment, when the movable portion is in a first position, a group of solar panels form part of an array and when the group of solar panels move from the first position to a second position, an opening is formed. In this example embodiment, the movable portion is configured to be moved to the second position to permit rooftop equipment to be lifted from the roof through the opening in the array, and the opening is large enough to pass the rooftop equipment, that was on the roof of the building, through the opening.

In accordance with various example embodiments, a method of moving the solar array section from the space above the equipment to be replaced or serviced may comprise any of the following methods or other methods or combinations of methods: rotating all or portions of the movable section up out of the way about a point of rotation located at the edge of the section or points of rotation located at multiple edges of the section; rotating all or portions of the movable section down out of the way about a point of rotation located at the edge of the section or points of rotation located at multiple edges of the section; rotating all or portions of the movable section up or down out of the way about points of rotation located along a pair sides of the movable section or points of rotation located along two pairs of sides of the section; rotating all or portions of the movable section up or down out of the way about points of rotation located along a pair sides of the movable section or about points of rotation located along two pairs of sides of the section coupled with appropriate counterbalancing weights to minimize the forces required to raise or lower the section or sections; lowering or raising the section and rolling it out of the way on tracks similar to garage door tracks; lowering the section onto a trolley and rolling it aside; and/or lowering the section down a column with a rotatable sleeve and rotating the section out of the way.

In accordance with an example embodiment, the height of the plurality of connecting beams is selected such that coverage of the roof is not limited by the avoidance of shading, at any time of the day or year, from any rooftop equipment.

While the principles of this disclosure have been shown in various embodiments, many modifications of structure, arrangements, proportions, elements, materials and components (which are particularly adapted for a specific environment and operating requirements) may be used without departing from the principles and scope of this disclosure. These and other changes or modifications are intended to be included within the scope of the present disclosure and may be expressed in the following claims.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments.

However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

When language similar to "at least one of A, B, or C" or "at least one of A, B, and C" is used in the claims or specification, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

We claim:

1. A solar structure for providing shade to a roof of a building, the solar structure comprising:
    a building support structure;
    the roof coupled to the building support structure;
    a plurality of vertical supports;
    a plurality of connecting beams, wherein the plurality of vertical supports are configured to support the plurality of connecting beams at a height above a surface of the roof of the building;
    a plurality of solar panels supported by the plurality of connecting beams over the roof and configured to provide shade to the roof of the building; and
    a fixed section of the solar structure, wherein the fixed section of the solar structure comprises a first subset of the plurality of solar panels, and wherein the fixed section of the solar structure is fixed during operation;
    wherein the plurality of vertical supports couple a load of the solar structure directly to the building support structure; and wherein the plurality of solar panels comprises an array of solar panels, wherein the solar structure supports the array of solar panels located over all or a portion of the roof of the building.

2. The solar structure of claim 1, wherein the plurality of vertical supports transfer the load of the solar structure directly to the building support structure without adding the load to the roof.

3. The solar structure of claim 1, wherein the plurality of vertical supports are attached to, and in-line with, corresponding columns of the building support structure.

4. The solar structure of claim 1, wherein the plurality of vertical supports comprise a continuous column that is part of the building support structure and that extends from below the roof up to at least one of the plurality of connecting beams.

5. The solar structure of claim 1, wherein the plurality of vertical supports comprise a continuous column that is part of the building support structure and that extends from a foundation up to at least one of the plurality of connecting beams.

6. The solar structure of claim 1, wherein the plurality of vertical supports are attached to the building support structure, but offset from, corresponding columns of the building support structure.

7. The solar structure of claim 1, wherein at least some of the plurality of vertical supports are attached directly to trusses of the building support structure.

8. The solar structure of claim 1, wherein the plurality of vertical supports are integral with the building support structure.

9. The solar structure of claim 1, wherein each of the plurality of vertical supports are attached to at least one of the plurality of connecting beams at a first end and to the building support structure at a second end of each of the plurality of vertical supports.

10. The solar structure of claim 9, wherein the plurality of vertical supports are each attached to the building support structure by one of the following techniques:
    a vertical support, of the plurality of vertical supports, is attached to, and in-line with, corresponding columns of the building support structure;
    the vertical support, of the plurality of vertical supports, comprises a continuous column that is part of the building support structure and that extends from below the roof up to at least one of the plurality of connecting beams; or
    the vertical support, of the plurality of vertical supports, is attached directly to trusses of the building support structure.

11. The solar structure of claim 1, wherein the solar structure further comprises a fixed portion, comprising some of the plurality of solar panels, and a movable portion, comprising others of the plurality of solar panels, wherein the movable portion is positioned over rooftop equipment and configured to move from a first position to a second position to facilitate passing the rooftop equipment from below the plurality of solar panels to above the plurality of solar panels.

12. The solar structure of claim 1, wherein the height is four feet to twenty feet measured from a point between a highest and a lowest point of the roof to a bottom of the plurality of connecting beams.

13. The solar structure of claim 1, further comprising:
a movable section of the solar structure, wherein the movable section of the solar structure comprises a second subset of the plurality of solar panels that is different from the first subset of the plurality of solar panels, wherein the movable section is movable from a closed position to an opened position, wherein the opened position opens an area of the solar structure to pass rooftop equipment through an opening formed by moving the movable section to the opened position; wherein the movable section comprises beams and purlins attached to the plurality of connecting beams; and wherein solar panels of the plurality of solar panels are attached to the purlins.

14. The solar structure of claim 1, wherein the solar structure is a non-ballast system without bolt penetrations into the roof.

15. The solar structure of claim 1, wherein the height of the plurality of connecting beams is selected such that coverage of the roof is not limited by avoidance of shading, at any time of day or year, from any rooftop equipment.

16. The solar structure of claim 1, wherein the solar structure occupies no more space, at the surface of the roof and at least up to seven feet above the surface of the roof, than that occupied by the plurality of vertical supports.

17. A method of constructing a steel frame structure of a building comprising:
extending a steel frame from a foundation to a height above a roof surface; and
supporting, via a support structure connected to the steel frame, an array of solar panels over a roof, wherein the array of solar panels comprise a fixed section including a first subset of the array of solar panels, wherein the fixed section is fixed during operation, wherein a load from the array of solar panels is transferred to the steel frame structure of the building without loading the roof, and wherein at least portion of the support structure for the array of solar panels is integrated into the steel frame structure of the building.

18. A method of constructing a steel frame structure of a building comprising:
constructing a steel frame above a roof surface; and
supporting, via a support structure connected to the steel frame, an array of solar panels at a height above a roof, wherein the array of solar panels comprise a fixed section including a first subset of the array of solar panels, wherein the fixed section is fixed during operation, wherein a load from the array of solar panels is transferred directly from the array of solar panels over the roof to the steel frame structure of the building.

19. The method of claim 18, further comprising covering both a rooftop equipment and access pathways to the rooftop equipment with the array of solar panels.

20. A solar structure for providing shade to a roof of a building, the solar structure comprising:
a building support structure;
the roof coupled to the building support structure;
a plurality of vertical supports;
a plurality of connecting beams, wherein the plurality of vertical supports are configured to support the plurality of connecting beams at a height above a surface of the roof of the building;
a plurality of solar panels supported by the plurality of connecting beams over the roof and configured to provide shade to the roof of the building; and
a fixed section of the solar structure, wherein the fixed section of the solar structure comprises a first subset of the plurality of solar panels, and wherein the fixed section of the solar structure is fixed during operation;
wherein the plurality of vertical supports couple a load of the solar structure directly to the building support structure; wherein the plurality of solar panels comprises an array of solar panels, and wherein the solar structure covers 75%-100% of the roof of the building.

* * * * *